US012214355B2

(12) United States Patent
Chen

(10) Patent No.: US 12,214,355 B2
(45) Date of Patent: Feb. 4, 2025

(54) PLANETARY ROLLER MILL FOR PROCESSING HIGH MOISTURE FEED MATERIAL

(71) Applicant: Schenck Process LLC, Kansas City, MO (US)

(72) Inventor: Michael M. Chen, Naperville, IL (US)

(73) Assignee: Coperion Process Solutions LLC, Kansas City, MO (US)

( * ) Notice: Subject to any disclaimer, the term of this patent is extended or adjusted under 35 U.S.C. 154(b) by 0 days.

(21) Appl. No.: 18/142,150

(22) Filed: May 2, 2023

(65) Prior Publication Data

US 2023/0338961 A1 Oct. 26, 2023

Related U.S. Application Data

(60) Division of application No. 16/338,890, filed as application No. PCT/US2017/054731 on Oct. 2,
(Continued)

(51) Int. Cl.
*B02C 15/08* (2006.01)
*B02C 15/00* (2006.01)
(Continued)

(52) U.S. Cl.
CPC ............ *B02C 15/08* (2013.01); *B02C 15/004* (2013.01); *B02C 23/02* (2013.01); *B02C 23/06* (2013.01);
(Continued)

(58) Field of Classification Search
CPC ..... B02C 15/001; B02C 15/004; B02C 15/02; B02C 15/08; B02C 2015/008; B02C 23/02; B02C 23/06; B02C 23/24
See application file for complete search history.

(56) References Cited

U.S. PATENT DOCUMENTS

| | | | |
|---|---|---|---|
| 1,609,529 | A | 12/1926 | Trowbridge |
| 2,506,499 | A | 5/1950 | Gibson |

(Continued)

FOREIGN PATENT DOCUMENTS

| | | | |
|---|---|---|---|
| CH | 291876 | A | 7/1953 |
| CN | 2832297 | Y | 11/2006 |

(Continued)

OTHER PUBLICATIONS

PCT International Search Report and Written Opinion issued in corresponding PCT Application No. PCT/US2017/054731, date mailed Jan. 17, 2018, pp. 1-14.

(Continued)

*Primary Examiner* — Jared O Brown
(74) *Attorney, Agent, or Firm* — Robinson & Cole LLP

(57) ABSTRACT

A planetary roller mill for processing a feed material includes a vessel with a grinding ring having an opening and a first area. The grinding ring is in sealing engagement with an inside surface of the vessel. At least two non-circular support plates are secured to a rotatable shaft. Each plate has an axially facing surface. A plurality of rollers are rotatably mounted to and positioned between the two support plates. Each of the plurality of rollers are in grinding communication with the grinding surface. The planetary roller mill includes an air supply system having an outlet in communication with the opening in the grinding ring. Areas of the two support plates are of magnitudes configuring a flow area through the opening of at least 30 percent of the first area to provide a predetermined quantity of heated air to remove moisture from the feed material in the mill.

42 Claims, 25 Drawing Sheets

Related U.S. Application Data

2017, now Pat. No. 11,679,392, which is a continuation of application No. PCT/US2016/055118, filed on Mar. 10, 2016.

(51) Int. Cl.

| | |
|---|---|
| ***B02C 23/02*** | (2006.01) |
| ***B02C 23/06*** | (2006.01) |
| ***B02C 23/24*** | (2006.01) |
| *B02C 15/02* | (2006.01) |

(52) U.S. Cl.

CPC ............ *B02C 23/24* (2013.01); *B02C 15/001* (2013.01); *B02C 2015/008* (2013.01); *B02C 15/02* (2013.01)

(56) References Cited

U.S. PATENT DOCUMENTS

| | | | | |
|---|---|---|---|---|
| 3,027,103 | A * | 3/1962 | Mischanski | B02C 15/08 241/131 |
| 3,337,142 | A * | 8/1967 | Williams | B02C 15/02 241/130 |
| 3,339,853 | A * | 9/1967 | Mischanski | B02C 15/02 241/110 |
| 4,022,387 | A | 5/1977 | Williams | |
| 4,184,640 | A | 1/1980 | Williams | |
| 5,205,499 | A | 4/1993 | Gamblin | |
| 5,373,996 | A | 12/1994 | Hamada | |
| 5,429,312 | A * | 7/1995 | Ohno | B02C 23/02 241/34 |
| 6,446,888 | B1 * | 9/2002 | Williams, Sr. | B02C 15/001 241/80 |
| 2009/0121056 | A1 | 5/2009 | Chen | |
| 2009/0121060 | A1 | 5/2009 | Chen | |
| 2013/0055934 | A1 | 3/2013 | Takeuchi | |
| 2014/0076210 | A1 | 3/2014 | Daimaru | |
| 2015/0196923 | A1 | 7/2015 | Fornefeld | |
| 2016/0096182 | A1 | 4/2016 | Storm | |

FOREIGN PATENT DOCUMENTS

| | | | |
|---|---|---|---|
| CN | 100998960 | A | 7/2007 |
| CN | 102350394 | | 2/2012 |
| CN | 102989555 | | 3/2013 |
| CN | 103203264 | A | 7/2013 |
| EP | 2886196 | A1 | 6/2015 |
| JP | 39006931 | | 5/1964 |
| JP | 49013463 | | 4/1974 |
| JP | 52112163 | A | 9/1977 |
| JP | 5511088 | A | 1/1980 |
| JP | 5991277 | | 1/1986 |
| JP | 2010024050 | | 2/2010 |
| JP | 2012086106 | A | 5/2012 |
| JP | 2013078707 | | 5/2013 |

OTHER PUBLICATIONS

PCT International Search Report and Written Opinion issued in corresponding PCT Application No. PCT/US2016/055118, date mailed Jun. 30, 2017.

International Preliminary Report on Patentability issued in corresponding PCT Application No. PCT/US2016/055118, date mailed Apr. 18, 2019.

International Preliminary Report on Patentability issued in corresponding PCT Application No. PCT/US2017/054731, date mailed Apr. 18, 2019.

Notifications of Reasons for Refusal issued in corresponding JP Application No. 2019-538573, date mailed Mar. 2, 2020, pp. 1-16.

Office Action issued in corresponding KR Application No. KR20197012441, dated May 14, 2020, pp. 1-9.

Partial Supplemental EP Search Report issued in corresponding EP Application No. 17858957.8, dated May 12, 2020, pp. 1-11.

* cited by examiner

PLANETARY ROLLER MILL FOR PROCESSING HIGH MOISTURE FEED MATERIAL

CROSS REFERENCE TO RELATED APPLICATIONS

This application is a divisional application of and claims priority to U.S. application Ser. No. 16/338,890, now U.S. Pat. No. 11,679,392, entitled Planetary Roller Mill for Processing High Moisture Feed Material, filed Apr. 2, 2019, which is a U.S. National Stage application of and claims priority to PCT Application No. PCT/US2017/054731, filed Oct. 2, 2017, which is a continuation application of and claims priority to PCT Application No. PCT/US2016/055118, filed Mar. 10, 2016.

TECHNICAL FIELD

The present invention is directed to a roller mill for processing high moisture feed material and in particular is directed to a planetary roller mill having air flow through a grinding assembly positioned in the roller mill for grinding, drying and/or calcining the high moisture feed material.

BACKGROUND

Grinding mills are used to crush and pulverize solid materials such as minerals, limestone, gypsum, phosphate rock, salt, coke and coal into small particles. A pendulum roller mill is one example of a typical grinding mill that can be used to crush and pulverize the solid materials. The grinding mills generally include a grinding section disposed inside a housing. The grinding mills can be mounted to a foundation. The grinding section can include a plurality of crushing members such as pendulum mounted rollers that moveably engage a grinding surface. The crushing members are in operable communication with a driver, such as a motor, which imparts a rotary motion on the crushing members. During operation of the grinding mill, pressurizing, gravitational or centrifugal forces drive the crushing members against the grinding surface. The crushing members pulverize the solid material against the grinding surface as a result of contact with the grinding surface.

As illustrated in FIG. 6, a prior art pendulum mill 100 has a stationary base assembly 110 that has a grinding mill assembly 180 positioned therein. A bottom portion 181 of the mill is secured to the base assembly by suitable fasteners 181F. The base assembly 110 has an upper annular plate 110U and a lower annular plate 110L that are spaced apart from and secured to one another by a plurality of angled vanes 110V. Adjacent vanes 110V define conduits 132 (e.g., nozzles) configured to convey air to the grinding mill assembly 110. A wall 105 (e.g., a cylindrical vessel) surrounds the grinding mill assembly 180 and is secured to the base assembly 110. The grinding mill assembly 180 includes a support shaft 182 rotationally supported by a bearing housing 184. The bearing housing 184 is secured to the bottom portion 181 of the pendulum mill 100 with suitable fasteners 185. One end of the shaft 182 is coupled to a drive unit (not shown) for rotating the shaft 182. An opposing end of the shaft 182 has a hub 186 mounted thereto. A plurality of arms 187 extend from the hub 186. Each of the arms 187 pivotally support a journal assembly 188 which has a roller 189 rotatingly coupled to an end thereof.

As shown in FIG. 7, the journal assembly 188 includes a journal head 188H having a collar 188C extending therefrom. The collar 188C has an inside surface defining a bore extending therethrough. The inside surface has a bushing 194A secured thereto. The collar 188C pivotally secures that journal assembly 188 to the arm 187 via a shaft 187P that extends from the arm 187. The shaft 187P extends into the bore and slidingly engages an inside surface of the bushing 194A. The bushing 194A is immersed in a lubricant, such as oil, that is contained in the bore by one or more seals (not shown).

As shown in FIG. 7, the journal head 188H has a stepped bore extending therethrough. The journal assembly 188 includes a shaft 193 having a longitudinal axis X10. A portion of the shaft 193 extends into the stepped bore and the journal head 188H is secured to the shaft 193 by a suitable fastener such as a pin 197C. An annular pocket 188P is formed between the shaft 193 and an inside surface defined by the stepped bore.

The journal assembly 188 includes an annular upper housing 188U having an interior area. An upper portion of the upper housing 188U extends into the annular pocket 188P. A radially outer surface of the upper housing 188U has a plurality of circumferential extending grooves (e.g., three grooves) formed therein. The radially outer surface of the upper housing 188U and the inside surface defined by the stepped bore of the journal head 188H, are radially spaced apart from one another by a gap G88R of a magnitude sufficient to allow rotation of the upper housing 188U relative to the journal head 188H. The journal head 188H and the upper housing 188U are axially spaced apart from one another by an axial gap G88 of a magnitude sufficient to allow rotation of the upper housing 188U relative to the journal head 188H. A labyrinth seal 195 is disposed in each of the grooves to rotationally seal across the gap G88R.

As shown in FIG. 7, a first flanged sleeve 194B extends into an inside surface of the upper housing 188U and is secured thereto by a pin 197B. The first flanged sleeve 194B has an inside surface that is spaced apart from the shaft 193 by a gap G88B of a magnitude sufficient to allow rotation of the upper housing 188U relative to the shaft 193. The upper housing 188U is restrained from axial downward movement by a shaft shoulder 193F that extends radially outward from the shaft 193. A thrust bearing 198 is positioned between the shoulder 193F and an interior shoulder of the upper housing 188H to support rotation of the upper housing 188H relative to the shaft 193.

As shown in FIG. 7, a lower housing 188L is secured to the upper housing 188U by a plurality of fasteners 196B. The lower housing 188L has a second flanged sleeve 194C that extends into an inside surface of the upper housing 188U and is secured thereto by a pin 197A. The second flanged sleeve 194C has an inside surface that is spaced apart from the shaft 193 by a gap G88C of a magnitude sufficient to allow rotation of the lower housing 188L relative to the shaft 193. The lower housing 188L has a closed bottom end. A roller 189 is disposed around the lower housing 188L and is secured thereto by a fastener 196A.

The roller 189, the lower housing 188L and the upper housing 188U are rotatable as a unit relative to the shaft 193. The gaps G88B and G88C are filled with a lubricant (e.g., oil or synthetic oil) between a low fill line LL and an upper fill line LU. The labyrinth seals 195 contain the oil in the gaps G88B and G88C and prevent debris from egressing therein. The use of the lubricant in the gaps G88B and G88C and between the pin 187P and the sleeve 194A imposes operational temperature limitations on the prior art pendulum mill 100 to protect the oil from degrading. For example, if a petroleum based oil is used, the temperature of the journal assembly 188 would have to be limited to about 250 degrees Fahrenheit. If a synthetic oil were to be used, the temperature of the journal assembly 188 would have to be limited to about 350 degrees Fahrenheit.

Such temperature constraints limit the prior art pendulum mill 100 for grinding materials with less than 10 weight percent moisture because insufficient heat is available to dry the material to be ground. For example, when calcining gypsum (e.g., synthetic gypsum natural gypsum or mixtures thereof), the outlet temperature required is around 325-350 degrees Fahrenheit, while the inlet temperature may be as high as 1000 degrees Fahrenheit. The temperature in the area of the journal assembly 188 is typically higher than the outlet temperature by at least 100 degrees Fahrenheit. As a result, the temperature of the journal assembly 188 would be in excess of 450 degrees Fahrenheit, which is above a maximum operating temperature for any lubricant, including petroleum based oil and synthetic oil. Thus, the prior art pendulum mills 100 are not configured for grinding, calcining and drying feed materials such as gypsum that have high moisture (e.g., 5 to 10 weight percent (wt %) surface moisture and about 20 wt % chemical bond moisture).

Referring back to FIG. 6, the roller 189 rollingly engages a hardened inward facing surface 129 of a ring 122. A plow assembly 190 is coupled to the hub 186 by a plow support 191. However, the journal assemblies 188 are quite heavy and thus require the speed at which the shaft 182, the hub 186, the arms 187, the journal assemblies 188 and the rollers 189 rotate, to be maintained below a predetermined magnitude to prevent excessive vibrations and bouncing of the journal assembly 188, which can damage the prior art pendulum mill 100. Prior art pendulum mills 100 tend to experience vibrations at high grinding speed that are required for grinding feed materials having a 40 to 80 micron size or less to produce a ground product of 25 to 35 microns. Therefore, the prior art pendulum mills 100 have speed limitations that prevent them from creating sufficient throughput, having ground particle sizes between 25 and 35 microns or finer.

During operation of the pendulum mill 100, the shaft 182 rotates the hub 186 and arms 187 so that the journal assemblies 188 swing outwardly in a pendulum manner. Thus, the rollers 189 are driven outwardly against the hardened surface 129 by centrifugal force. Material to be crushed or pulverized by the grinding mill assembly 110 is introduced into an interior area 180A of the pendulum mill 100 via a chute (not shown) from above the grinding mill assembly 180 and fed to the plow assembly 190 which projects the material to be crushed or pulverized back up into the area of the rollers 189 and the ring 122. Air is supplied to the pendulum mill 100 through the conduits 132, as indicated by the arrows marked 192. The material is crushed between the rollers 189 and the hardened surface 129 of the ring 122.

As illustrated in FIG. 8, a prior art planetary mill 200 for ultra-fine grinding has a grinding mill assembly 280 positioned therein. As used herein, the term "ultra-fine" refers to a material that is ground to a particle size range of d50<5 micron, where d50 is defined as average particle size by weight. An outer wall 205 (e.g., a cylindrical vessel) surrounds the grinding mill assembly 280. The grinding mill assembly 280 includes a support shaft 282 rotationally supported by a bearing housing 284. One end of the shaft 282 is coupled to a drive unit (not shown) for rotating the shaft 282. An opposing end of the shaft 282 has an upper plate (e.g., circular disc shaped plate) 286U and a lower plate (e.g., circular disc shaped plate) 286L spaced apart from one another and mounted to the shaft 282. A plurality of rollers 289 (e.g., six rollers shown in FIG. 9) are positioned between the upper plate 286U and the lower plate 286L in a planetary arrangement around the shaft 282. Each of the rollers 289 is supported for rotation by a pin 289P that extends through the roller 289 and is secured to the upper plate 286U and the lower plate 286L. Each of the rollers 289 rollingly engages a hardened inward facing surface 229 of a ring 222. The upper plate 286U and the lower plate 286L are concentric with the ring 222. An outermost circumferential surface of each of the upper plate 286U and the lower plate 286L are spaced apart from the hardened inward facing surface 229 of the ring 222 by distances D1 and D2, respectively, thereby forming annular gaps G1 and G2, respectively.

As shown in FIG. 9, the inward facing surface 229 of the ring 222 has an inside diameter D5 that defines a cross sectional area A1. The annular gap G1 has an area A2 that is up to about 10 percent of the area A1.

Referring to FIG. 8, a distribution plate 291 (e.g., circular disc shaped plate) is mounted to the shaft 282 below a lower edge 222E of the ring 222 and is spaced apart from the lower edge 222E by a distance D3, thereby forming a gap G3. The distribution plate 291 has an upper surface 291U.

As shown in FIG. 8, an annular partition 205F is positioned inside of the outer wall 205 and is spaced apart therefrom by a distance D4, thereby forming an annular gap G4 between the outer wall 205 and the partition 205F. A lower edge of the partition 205F is positioned near the upper edge of the ring 222. A radially outer surface of the ring 222 is spaced apart from an inside surface of the outer wall 205 by a distance D6, thereby forming an annular gap G6 between the outer wall 205 and the ring 222.

As shown in FIG. 8, a classifier assembly 255 is rotatably mounted to an upper end 205U of the outer wall 205 by a shaft 255X. The classifier assembly 255 has a plurality of spaced apart vanes 255V mounted between opposing plates that are secured to the shaft 255X. An interior area defined by the vanes communicates with a duct 255D that discharges into to an outlet duct 233. An air inlet duct 211 is mounted to a lower portion of the outer wall 205 below the grinding mill assembly 280 and the distribution plate 291.

During operation of the prior art planetary mill 200 for ultra-fine grinding, material to be ground M1 is fed into an interior area defined by the partition 205F and falls onto the upper plate 286U. The upper and lower plates 286U and 286L are rotated by the shaft 282. The rotation of the upper and lower plates 286U and 286L causes the rollers 289 to move radially outward from the shaft 282 and the pin 289P thereby rotatingly engaging the inward facing surface 229 of the ring 222. The material to be ground M1 is distributed radially outward on the upper plate by centrifugal force. The material to be ground falls into the gap G1 and is ground into a ground material M2 between the rollers 289 and the inward facing surface 229 of the ring 222. The ground material M2 falls onto the upper surface 291U of the distribution plate 291 and is discharged into the gap G6 between the outer wall 205 and the ring 222.

Air is supplied to the inlet duct 211, as indicated by the arrows F1, which communicates with the gap G6 between the outer wall 205 and the ring 222, essentially bypassing the grinding assembly 280. The gaps G1, G2 and G3 are minimized to minimize air flow through the grinding assembly, minimize the flow-through velocity in the grinding assembly and to increase retention time, of the material to be ground M1, in the grinding assembly 280 so that ground material M2 is ground into an ultra-fine state. The absence of air flow at high velocities through the grinding assembly 280 limits the use of the prior art planetary mill 200 to grinding materials with less than 5 weight percent moisture because insufficient air flow is available for drying the material to be ground. The air entrains the ground material M2 through the gap G6 and further through the gap G4 between the outer wall 205 and the partition 205F. The air conveys the ground material M2 into the classifier assembly 255 as indicated by the arrows F3. The classifier assembly 255 discharges the ground material M2 in the ultra-fine state via the outlet duct 233 and returns larger, not fully ground, material M3 back into the grinding assembly 280.

As shown in FIG. 11, the feed outlet 22B in the feed section 20B provides communication between the material feed apparatus 22 and the feed outlet 22B that extends to an inside surface 20D of the of the vessel assembly 20. Material fed by the material feed apparatus 22 travels through the feed outlet 22B and falls, with the assistance of the force of gravity, onto the axial upper edge 32X of the grinding ring 32, as indicated by the arrow R20. A portion of the material to be ground (e.g., larger and/or heavier particles) can fall off of the axial upper edge 32X into the grinding section 20A, as indicated by the arrow R21. However, smaller particles and fines (e.g., synthetic gypsum and limestone) can be drawn away from the grinding section 20A by an updraft of air as indicated by the arrow 51A, thereby bypassing the grinding section 20A.

U.S. Pat. No. 3,027,103 discloses a grinding mill for comminuting solid material and having pressure responsive means for varying the pressure of grinding rollers against the inner face of a grinding ring, such that any movement of the rollers is due to admitting fluid under pressure to a pressure chamber so as to force pistons radially outward against the yokes and thus increase the grinding pressure of the rollers against the grinding ring. However, U.S. Pat. No. 3,027,103 does not disclose or suggest that the radially outward movement of each of the plurality of rollers as a result of rotation of the shaft.

U.S. Pat. No. 3,027,103 further discloses yokes that are mounted in arcuately spaced relation on spiders which are splined or otherwise secured on a shaft above the bearing support for rotation of the yokes with the shaft. The yokes have inward and outward radial movement with reference to the spiders on upper and lower cylindrical bars for each yoke. U.S. Pat. No. 3,027,103 also discloses that a yoke is provided for each pair of rollers. The rollers are mounted on a yoke and each of the yokes include upper and lower arms that are connected together by a vertical web. The yokes are arranged in oppositely spaced relation and have inward and outward radial movement with reference to upper and lower cylindrical blocks which are splined or otherwise affixed to a rotatably mounted shaft. However, U.S. Pat. No. 3,027,103 does not disclose or suggest any support plates for the rollers that are attached to the shaft.

As shown in FIG. 10, U.S. Pat. No. 1,609,529 is directed to a pulverizing machine 300 that has material feed 301 through a circumferential inlet 302 extending through a grinding ring 303 to produce a talc. After the talc has been pulverized, the talc is drawn out from between the rolls 350 by means of an exhaust fan. The pulverizing machine 300 disclosed in U.S. Pat. No. 1,609,529 includes a side wall 314 that has an opening that limits the size of the flow area FA proximate the outlet of the pulverizing machine.

Based on the foregoing, there is a need for an improved roller mill that is configured to dry and grind feed material with high moisture content.

SUMMARY

There is disclosed herein a planetary roller mill for processing a feed material such as Kaolin clay, bentonite, limestone, pet coke, coal, synthetic gypsum, natural gypsum and mixtures of synthetic and natural gypsum. The planetary roller mill includes a grinding assembly that is configured for grinding the feed material at a grinding zone air temperature of at least 177 degrees Celsius (350 degrees Fahrenheit). Such high air temperatures can be accommodated because no lubricant is required for the rollers, as described herein. The planetary roller mill includes a vessel assembly mounted to a stationary frame. The vessel assembly has an inside surface and a material feed supply in communication with the vessel assembly. A grinding assembly is positioned in the vessel assembly below the material feed supply. The grinding assembly includes an annular grinding ring that has an opening extending therethrough. The opening is defined by a radially inward facing grinding surface and has a first area. The grinding ring is in sealing engagement with the inside surface of the vessel assembly. The grinding assembly includes a shaft rotatably mounted to the frame. A first support plate secured to the shaft and has a first axially facing surface defining a second area. A second support plate is also secured to the shaft and has a second axially facing surface defining a third area. The second support plate is spaced axially apart from the first support plate. A plurality of rollers is rotatably mounted to and positioned between the first support plate and the second support plate. Each of the plurality of rollers is configured to move between the first support plate and the second support plate as a result of rotation of the shaft. Each of the plurality of rollers has a radially outer surface that is in grinding communication with the grinding surface of the grinding ring, for example, the outer surface rollingly engages the grinding surface of the grinding ring or the outer surface is in sufficient proximity to the grinding surface of the grinding ring to effectuate grinding. The planetary roller mill has an air supply system that has an outlet that is in communication with the opening in the grinding ring for supplying air through the opening. For example, in one embodiment the outlet of the air supply system is connected to a bottom portion of the opening of the grinding ring, beneath the plurality of rollers. The first support plate and the second support plate are of a non-circular shape such that the second area of the first support plate and the third area of the second support plate are of magnitudes which configure a flow area through the opening of at least 30 percent of the first area to provide a predetermined quantity of heated air to remove moisture from the feed material in the grinding assembly.

In one embodiment, the each of the plurality of rollers has a bore axially extending therethrough. The bore has an inside diameter. Each of the plurality of rollers is mounted on a pin secured to and extending between the first plate and the second plate. The pin has an outside diameter that is less than the inside diameter of the bore.

In one embodiment, the flow area is from 40 to 70 percent of the first area so that the predetermined quantity of heated air is sufficient to dry and/or calcining synthetic, natural gypsum or a mixture thereof.

In one embodiment, the flow area is from 40 to 50 percent of the first area so that the predetermined quantity of heated air is sufficient to dry and calcining synthetic, natural gypsum or a mixture thereof.

In one embodiment, the flow area is from 40 to 70 percent of the first area so that the predetermined quantity of heated air is sufficient to dry and/or calcining synthetic gypsum having about 10 wt % surface moisture and about 20 wt % chemical bond moisture, natural gypsum having about 5% surface moisture and about 20 wt % bond moisture or a mixture of synthetic gypsum and natural gypsum about 5 wt % to about 10 wt % surface moisture and about 20 wt % chemical bond moisture, while providing sufficient dwell time in the grinding section to produce a ground calcined product of a predetermined particle size.

In one embodiment, the flow area is from 40 to 50 percent of the first area so that the predetermined quantity of heated air is sufficient to dry and/or calcining synthetic gypsum having about 10 wt % surface moisture and about 20 wt % chemical bond moisture, natural gypsum having about 5% surface moisture and about 20 wt % chemical bond moisture or a mixture of synthetic gypsum and natural gypsum about 5 wt % to about 10 wt % surface moisture and about 20 wt % chemical bond moisture, while providing sufficient dwell time in the grinding section to produce a ground calcined product of a predetermined particle size.

In one embodiment, the predetermined quantity of heated air is sufficient to dry and/or calcining the feed material having a particle size of less than 1 millimeter.

In one embodiment, the flow area is from 30 to 60 percent of the first area so that the predetermined quantity of heated air is sufficient to remove moisture from a feed material such as of Kaolin clay, bentonite, limestone, pet coke and/or coal.

In one embodiment, the flow area is from 30 to 60 percent of the first area so that the predetermined quantity of heated air is sufficient to remove moisture from the feed material having a moisture content of greater than 5 wt %, while providing sufficient grinding area to produce a ground dried product of a predetermined particle size.

In one embodiment, the flow area is from 30 to 60 percent of the first area so that the predetermined quantity of heated air is sufficient to remove moisture from a feed material having a particle size of about 0.05 to about 50 mm.

In one embodiment, the flow area is from 30 to 40 percent of the first area so that the predetermined quantity of heated air is sufficient to remove moisture from a feed material such as of Kaolin clay, bentonite, limestone, pet coke and/or coal.

In one embodiment, the flow area is from 30 to 40 percent of the first area so that the predetermined quantity of heated air is sufficient to remove moisture from the feed material having a moisture content of greater than 5 wt %, while providing sufficient grinding area to produce a ground dried product of a predetermined particle size.

In one embodiment, the flow area is from 30 to 40 percent of the first area so that the predetermined quantity of heated air is sufficient to remove moisture from a feed material having a particle size of about 0.05 to about 50 mm.

In one embodiment, the radially outer surface of each of the rollers is convex and the grinding surface of the grinding ring is concave. However, in another embodiment, the radially outer surface of each of the rollers is substantially straight and the grinding surface of the grinding ring is substantially straight. In one embodiment, each of the rollers has a conical outer surface and the grinding surface of the grinding ring is sloped to receive the conical rollers.

In one embodiment, the grinding assembly includes a plow assembly that is rotatable with the shaft and is configured to transport the feed material from below the grinding assembly to the plurality of rollers and grinding ring.

In another embodiment, the planetary roller mill includes one or more additional support plates that are secured to the shaft. The additional support plates are spaced axially apart from the first support plate and the second support plate. An additional plurality of rollers is mounted to and positioned between the one of the additional support plates and the first support plate or the second support plate. Each of the additional plurality of rollers is configured to move between the first support plate, the second support plate and the additional support plate as a result of rotation of the shaft. Each of the plurality of additional rollers has the radially outer surface that is in grinding communication with the grinding surface of the grinding ring.

In one embodiment, the grinding assembly is configured for grinding the feed material at a grinding zone air temperature of at least 177 degrees Celsius (350 degrees Fahrenheit).

In one embodiment, no lubricant is disposed in a bore defined by each of the plurality of rollers.

In one embodiment, the material feed supply includes an outlet that extends through the vessel assembly into an interior area thereof. A ramp is secured to the inside surface and extends downwardly and radially inward relative to the outlet and at least partially between the outlet and the grinding ring. In one embodiment, a cover is positioned over the outlet and at least a portion of the ramp.

In one embodiment, the roller mill includes means for adjusting (e.g., a shim stack) the vertical position of the rollers relative to the grinding ring.

In one embodiment, the first support plate and/or the second support plate have a central area and one or more lobes extending outwardly from the central area. The lobes that have an asymmetrical shape. The lobes each have an area (e.g., an opening, a recess, or surface) for receiving a roller mounting pin. The area has a center point. The asymmetric shape includes a trailing edge and a leading edge generally opposite the trailing edge. The trailing edge extends further away from the center point, than does the leading edge.

In one embodiment, each of the plurality of rollers has an axial end. The center point is positioned on the lobe such that during rotation of the first support plate and the second support plate in a direction from the trailing edge to the leading edge, the lobe covers at least a portion of the axial end of the roller adjacent to the leading edge and the trailing edge.

There is disclosed herein a grinding mill for processing feed material. The grinding mill includes a vessel assembly mounted to a stationary frame and having an inside surface. The grinding mill includes a material feed supply that is in communication with an interior area of the vessel assembly via an outlet extending radially inward through the inside surface. A grinding assembly (e.g., a pendulum configuration or a planetary configuration) is positioned in the vessel assembly. The grinding assembly includes an annular grinding ring that has a radially inwardly facing grinding surface. A shaft is rotatably mounted to the frame, for example via a bearing assembly. The plurality of rollers are configured to be in grinding communication with the grinding surface. A ramp is secured to the inside surface and extends downwardly and radially inward relative to the outlet and at least partially between the outlet and the grinding ring. In one embodiment, a bottom portion of the ramp terminates radially outward in an inner radial edge (e.g., portion of the grinding surface) of the grinding ring and disposed radially outwardly from the grinding rollers.

In one embodiment, a cover is positioned (e.g., mounted by welding or with mechanical fasteners) over the outlet and at least a portion of the ramp. In one embodiment, the cover includes one or more side plates or walls and one or more front plates (e.g., sloped, horizontal and/or vertical plates or walls). In one embodiment, the cover is positioned radially outwardly from the grinding rollers. In one embodiment, a portion of the cover extend radially inward of the grinding ring. The grinding assembly may be a planetary configuration having grinding rollers disposed between support plates in a planetary configuration (see, for example, FIGS. 1A and 1B). The grinding assembly may be a pendulum type having grinding rollers supported via a pendulum configuration (see, for example, FIGS. 6 and 7).

In one embodiment, a support structure (e.g., spider plate, a hub, support plates, support arms, gussets and combinations thereof) is secured to the shaft. In one embodiment, a plurality of rollers is rotatably mounted to the support structure in a pendulum or planetary configuration. In one embodiment, the grinding mill is either a planetary roller mill or a pendulum mill.

There is further disclosed herein a method of retrofitting a roller mill such as a pendulum mill. The method includes providing a roller mill that has a vessel assembly mounted to a stationary frame and a grinding assembly positioned in the vessel assembly. The grinding assembly includes a first grinding ring that has a first opening extending therethrough. The first opening is defined by a first radially inward facing grinding surface and has a first area. The first grinding ring is in sealing engagement with the inside surface of the vessel assembly. A shaft is rotatably mounted to the frame. A hub is mounted to one end of the shaft, for example via a key and keyway configuration. A plurality of arms (e.g., spider plates) extend from the hub. The grinding assembly includes a plurality of journal assemblies. One of the plurality of journal assemblies is pivotally secured to each of the plurality of arms. The grinding assembly includes a plurality of first rollers. One of the plurality of first rollers is rotatingly coupled to each journal assembly. The method of retrofitting the roller mill includes removing the plurality of arms, the plurality of journal assemblies and the plurality of first rollers from the roller mill. The method includes providing a sleeve, a first support plate, a second support plate and a plurality of second rollers. The sleeve is positioned over the shaft and the sleeve is secured to the shaft via the hub. The method includes securing the first support plate to the sleeve. The first support plate has a first axially facing surface that defines a second area. The method includes securing the second support plate to the sleeve. The second support plate has a second axially facing surface that defines a third area. The second support plate is spaced axially apart from the first support plate. The method includes rotatably mounting the plurality of second rollers to and between the first support plate and the second support plate so that each of the plurality of rollers is configured to move radially outward relative to the shaft as a result of rotation of the shaft and/or move between the first and second support plate. Each of the plurality of rollers have a radially outer surface. The first support plate and the second support plate are of a non-circular shape such that the second area of the first support plate and the third area of the second support plate are of magnitudes which configure a flow area through the first opening of at least 30 percent of the first area to provide a predetermined quantity of heated air to remove moisture from the feed material in the grinding assembly.

In one embodiment, the method includes providing a first plow assembly secured to the hub. The first plow assembly is removed from the roller mill. The method includes providing one or more second plow assemblies and securing the second plow assembly or assemblies to a bottom portion of the second support plate.

In one embodiment, the method includes removing the first grinding ring from the roller mill. A second grinding ring is provided. The second grinding ring has the first opening defined by the first radially inward facing grinding surface and having the first area. The first area of the first and second grinding rings may be of equal or different magnitudes. The method includes installing the second grinding ring in the roller mill.

In one embodiment, the method includes installing the second grinding ring in sealing engagement with the inside surface of the vessel assembly.

In one embodiment, the method includes adjusting the vertical position of the rollers relative to the grinding ring, for example, with the use of a shim stack.

There is further disclosed herein a support plate for a planetary roller mill. The support plate includes a central area that has a center of rotation and one or more lobes extending radially outward from the central area. Each of the lobes has an asymmetrical shape. Each of the lobes has an area (e.g., a recess, an opening or a surface) for receiving a roller mounting pin. The area has a center point. The asymmetric shape includes a trailing edge and a leading edge generally opposite the trailing edge. The trailing edge extends further away from the center point than does the leading edge.

In one embodiment, the center point is positioned on the lobe such that during rotation of the support plate in a direction from the trailing edge to the leading edge, the lobe is configured to cover at least a portion of an axial end of a roller, adjacent to the leading edge and the trailing edge.

There is further disclosed herein a grinding mill for processing feed material (e.g., fine feed material such as gypsum and limestone). The grinding mill includes a vessel assembly mounted to a stationary frame. The vessel assembly includes a vessel that has a vessel wall with an inside surface which defines an interior area of the vessel. The vessel assembly includes a material feed supply that is in communication with the interior area via a feed outlet which extends through the vessel wall. The feed outlet has a bottom edge and an upper edge. The vessel assembly includes a grinding assembly that is positioned in the vessel. The grinding assembly includes a grinding ring that has an axially upward facing surface and an inwardly facing grinding surface. The grinding assembly includes a plurality of grinding rollers that are rotatably mounted relative to the grinding surface. The plurality of grinding rollers are configured to be in grinding communication with the grinding surface. The vessel assembly includes a ramp that has an upper ramp end and a lower ramp end. The upper ramp end is positioned proximate to the inside surface at a location proximate the feed outlet. The ramp extends downwardly and radially inward from the feed outlet. The lower ramp end of the ramp is located between the grinding surface and the inside surface.

In some embodiments, the upper ramp end is secured to the inside surface at the bottom edge of the feed outlet.

In some embodiments, the upper ramp end is secured to the inside surface below the bottom edge of the feed outlet.

In some embodiments, the lower ramp end is located proximate the axially upward facing surface of the grinding ring or above the axially upward facing surface of the grinding ring.

In some embodiments, the lower ramp end rests on the axially upward facing surface of the grinding ring.

In some embodiments, the lower ramp end is spaced apart from the grinding surface by a radial distance configured to accommodate wear of the grinding ring thereby maintaining space between the lower ramp end and radially outer surfaces of the grinding rollers.

In some embodiments, a cover is positioned over the feed outlet and at least a portion of the ramp.

In some embodiments, the cover includes one or more front sloped walls and one or more side walls.

In some embodiments, a portion of the cover is disposed radially outwardly from the grinding rollers.

In some embodiments, a portion of the cover is disposed over a portion of the grinding rollers.

In some embodiments, the cover has a top cover end that is secured to the inside surface above the upper edge of the feed outlet.

In some embodiments, the front sloped wall terminates at a bottom cover end of the cover which is located at a distance above the axial upper edge of the grinding ring.

In some embodiments, the front sloped wall terminates at a bottom cover end of the cover which is coplanar with the axial upper edge of the grinding ring.

In some embodiments, there is a direct and unobstructed flow path between the feed outlet and a grinding section for material to be ground, the flow path being formed by the ramp and the cover.

In some embodiments, the cover includes a sloped surface supported by opposing side walls.

In some embodiments, the ramp and the cover cooperate to form a material carry-away deterrent feature configured to inhibit fine feed material from being carried away by an updraft in the grinding mill and to urge the feed material into the grinding section.

In some embodiments, the ramp and the cover cooperate to form an air-flow disruption minimizer feature configured for use in grinding of synthetic gypsum, limestone and other fine feed materials.

In some embodiments, the ramp, the cover and the opposing side walls are integrally formed as a one-piece assembly.

In some embodiments, the ramp, the cover and the opposing side walls are removably secured to the inside surface.

In some embodiments, the grinding assembly is: 1) a planetary grinding roller and support plate assembly; or 2) a pendulum grinding roller and support structure assembly.

There is further disclosed herein a grinding mill for processing feed material (e.g., fine feed material such as gypsum and limestone). The grinding mill includes a vessel assembly mounted to a stationary frame. The vessel assembly includes a vessel that has a vessel wall with an inside surface which defines an interior area of the vessel. The vessel assembly includes a material feed supply that is in communication with the interior area via a feed outlet that extends through the vessel wall. The feed outlet has a bottom edge and an upper edge. A grinding assembly is positioned in the vessel. The grinding assembly includes a grinding ring that has an axially upward facing surface and an inwardly facing grinding surface. The grinding assembly includes a plurality of grinding rollers that are rotatably mounted relative to the grinding surface, the plurality of grinding rollers being configured to be in grinding communication with the grinding surface. The grinding mill also includes a cover positioned over the feed outlet.

In some embodiments, the cover includes one or more front sloped walls and one or more side walls.

In some embodiments, a portion of the cover is disposed radially outwardly from the grinding rollers.

In some embodiments, a portion of the cover is disposed over a portion of the grinding rollers.

In some embodiments, the cover has a top cover end that is secured to the inside surface above the upper edge of the feed outlet.

In some embodiments, the front sloped wall terminates at a bottom cover end of the cover which is located at a distance above the axial upper edge of the grinding ring.

In some embodiments, the front sloped wall terminates at a bottom cover end of the cover which is coplanar with the axial upper edge of the grinding ring.

In some embodiments, there is a direct and unobstructed flow path between the feed outlet and a grinding section for material to be ground, the flow path being formed by the cover.

In some embodiments, the cover includes a sloped surface supported by opposing side walls.

In some embodiments, the cover forms a material carry-away deterrent feature configured to inhibit fine feed material from being carried away by an updraft in the grinding mill and to urge the feed material into the grinding section.

In some embodiments, the cover forms an air-flow disruption minimizer feature configured for use in grinding of synthetic gypsum, limestone and other fine feed materials.

In some embodiments, the cover and the opposing side walls are integrally formed as a one-piece assembly.

In some embodiments, the cover and the opposing side walls are removably secured to the inside surface.

In some embodiments, the grinding assembly is: 1) a planetary grinding roller and support plate assembly or 2) a pendulum grinding roller and support structure assembly.

DETAILED DESCRIPTION

Figure 1A:
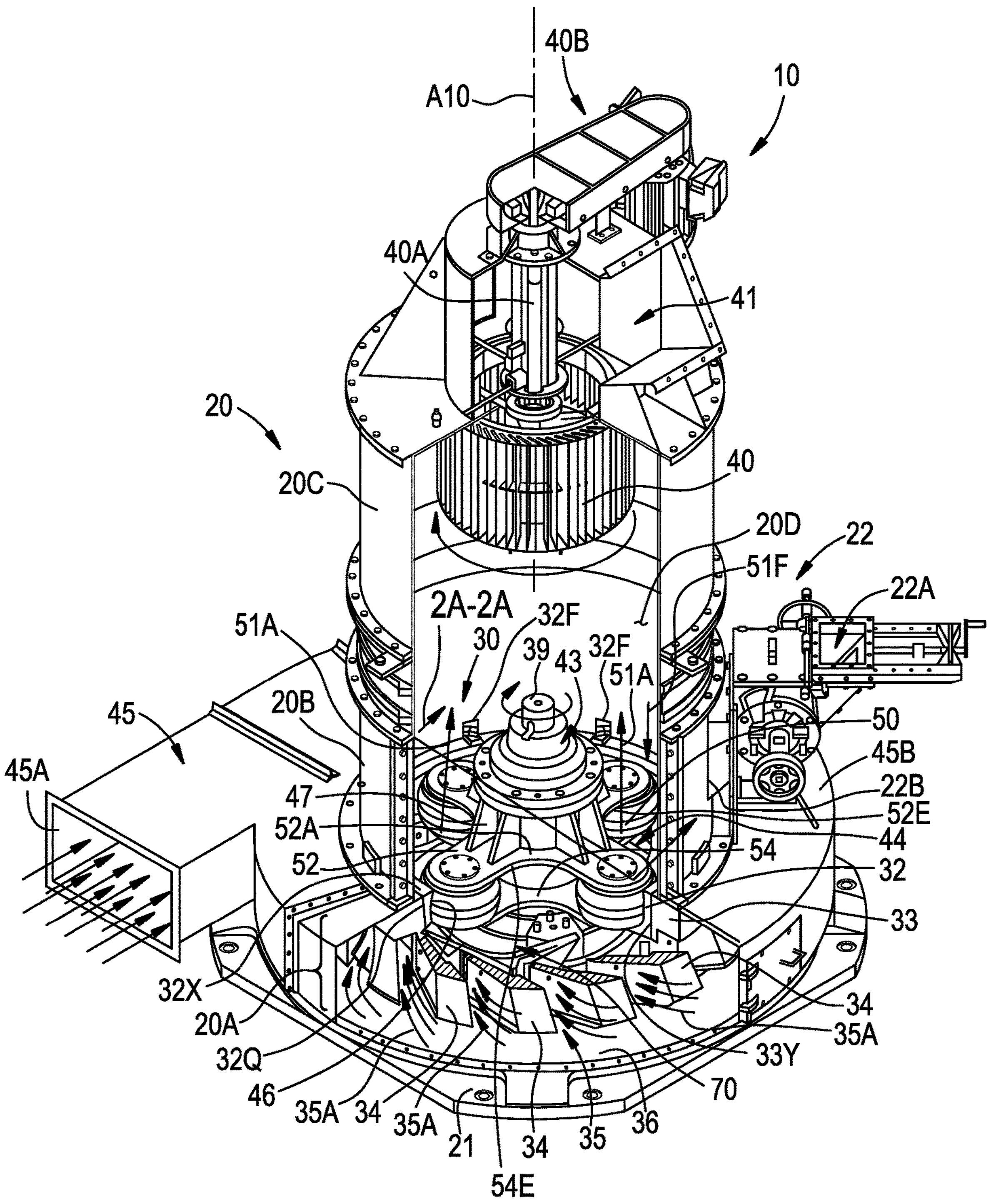
FIG. 1A is a perspective view of the planetary roller mill of the present invention with four contoured rollers.
Figure 12:
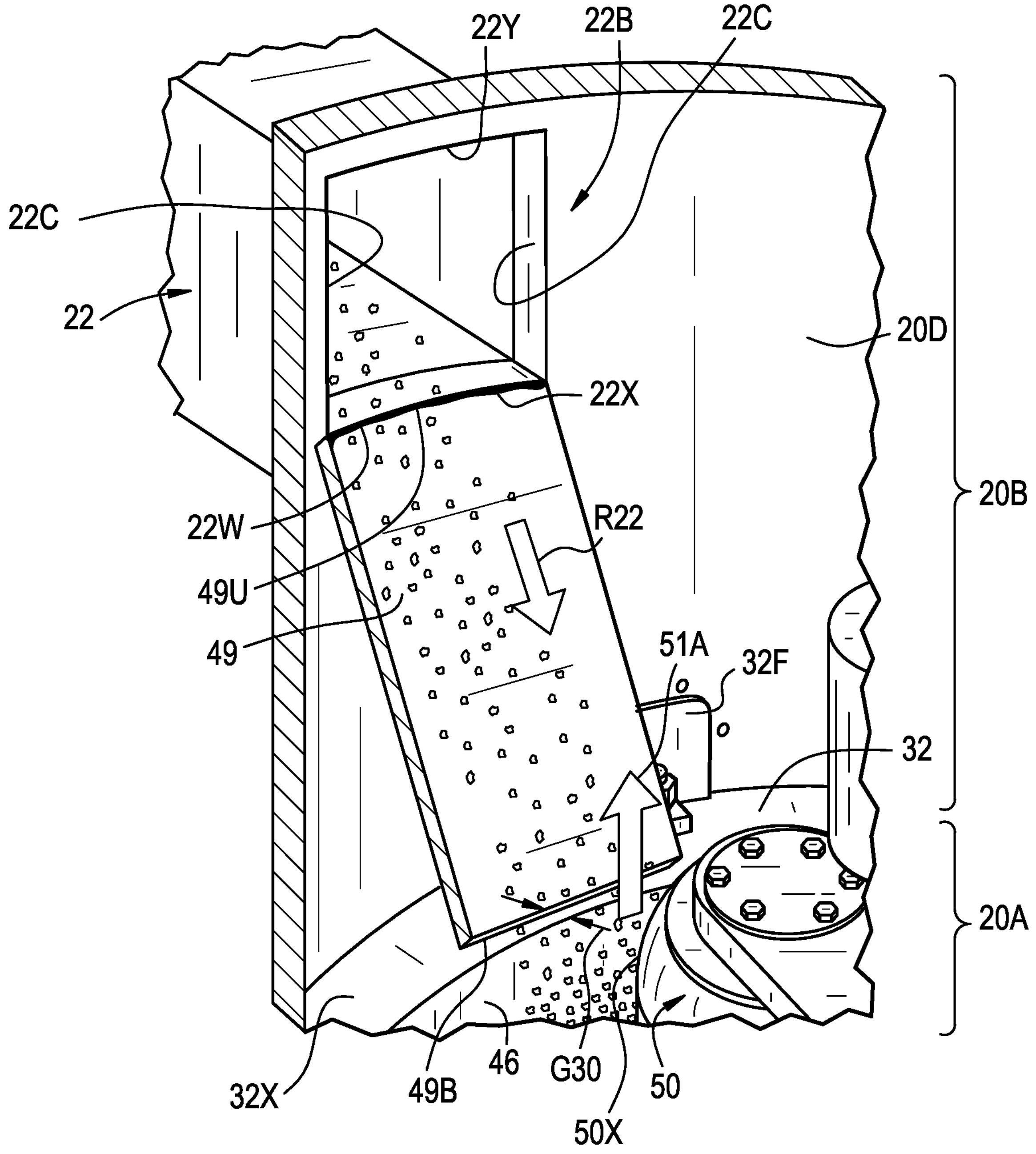
FIG. 12 is a perspective view of an interior area of a grinding mill shown with a ramp extending from the feed outlet.

As shown in FIG. 1A, a planetary roller mill (also referred to as "roller mill" herein) for processing (e.g., grinding, drying, and/or calcining) a feed material such as, but not limited to, synthetic gypsum, natural gypsum, mixtures of synthetic gypsum and natural gypsum, Kaolin clay, bentonite, limestone, pet coke and coal, is generally designated by element number 10. Thus, the roller mill 10 has utility in removing moisture from the feed material in the grinding assembly. The roller mill 10 includes a vessel assembly 20 mounted to a stationary frame 21. The vessel assembly 20 is shown in a vertical orientation about an axis A10. The vessel assembly 20 includes: 1) a grinding section 20A located at a bottom portion of the vessel assembly; 2) a material feed section 20B located axially above the grinding section 20A; and 3) a classifier housing 20C located axially above the feed section 20B. A material feed apparatus 22 is in communication with and secured to the material feed section 20B. The material feed apparatus 22 has an inlet 22A for receiving material to be supplied thereto; and a feed outlet 22B for supplying the feed material to the feed section 20B through a side wall of the feed section 20B. The feed outlet 22B of the material feed apparatus 22 is positioned axially above the grinding section 20A such that the feed material enters the grinding section 20A axially above the rollers 50 and above an axial upper edge 32X of a grinding ring 32. As shown in FIG. 12, the feed outlet 22B has a bottom edge 22X and top edge 22Y and two side walls 22C which extend between the top edge 22Y and the bottom edge 22X. A turbine classifier 40 is rotationally mounted to a top portion of the vessel assembly 20 via a shaft 40A that is coupled to a drive assembly 40B for rotation of the shaft 40A and the turbine classifier 40. The turbine classifier 40 is in communication with an outlet 41 of the vessel assembly 20. The turbine classifier 40 allows properly ground material to be discharged through the outlet 41 while returning material that requires additional grinding, back to the grinding section 20A. While the turbine classifier 40 is shown and described, the present invention is not limited in this regard as other classifiers may be employed including but not limited to the whizzer separator shown and described in U.S. Pat. No. 2,108,609 that issued on Feb. 15, 1938 to R. F. O'Mara and also described in PCT Application No. PCT/US2017/23560, with reference to FIGS. 2 and 3 contained therein.

Figure 1B:
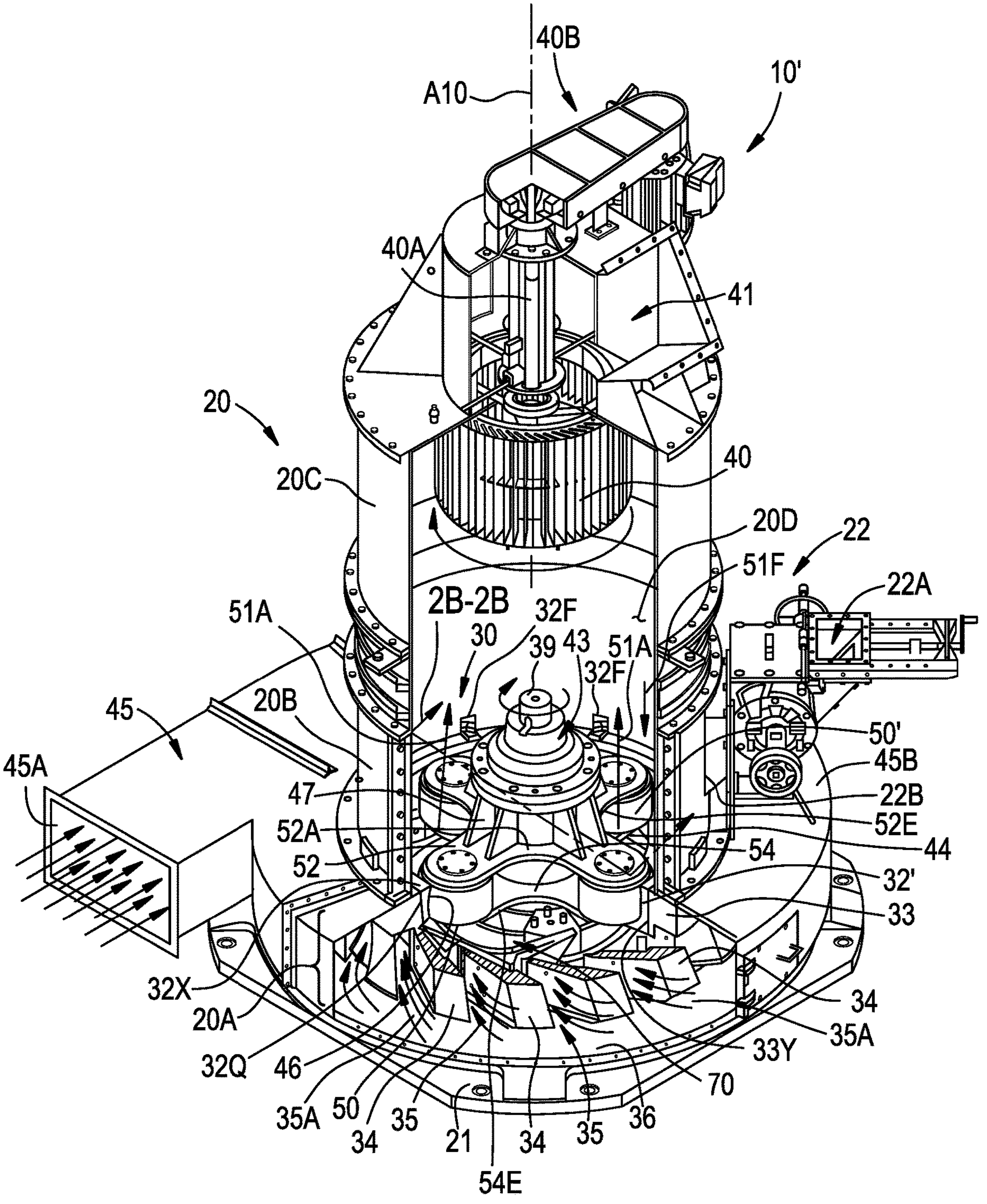
FIG. 1B is a perspective view of the planetary roller mill of the present invention with four straight rollers.
Figure 14:
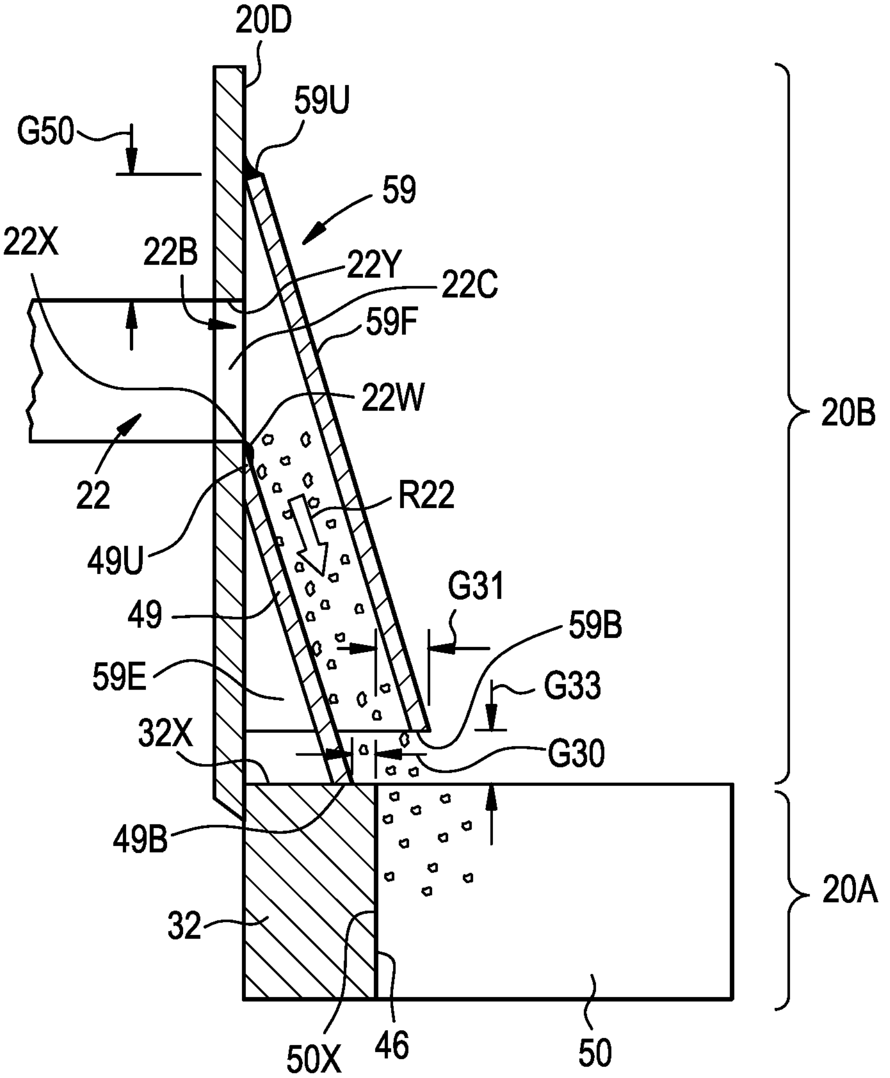
FIG. 14 is a cross sectional view of a grinding mill of shown with a ramp and cover extending from the feed outlet.

As shown in FIGS. 12 and 14, a ramp 49 extends from a bottom edge 22X of the feed outlet 22B and slopes downwardly and radially inward to the axial upper edge 32X of the grinding ring 32 of a planetary type roller mill, such as those shown in FIGS. 1A and 1B. The upper ramp end 49U is secured to the inside surface 20D at the bottom edge 22X of the feed outlet 22B. While the ramp 49 is shown and described as being employed with the planetary type roller mill, the ramp 49 may also be employed in a pendulum type roller mill, such as those shown in FIGS. 6 and 7. The ramp 49 may be employed in any type of grinding mill. In one embodiment, an upper ramp end 49U of the ramp 49 is secured to the inside surface 20D of the of the vessel assembly 20 by a weld 22W, for example, the weld 22W located at the bottom edge 22X of the feed outlet 22B. In one embodiment, a lower ramp end 49B of the ramp 49 rests on (see FIG. 12) or is secured to (e.g., via a weld 32W, see FIG. 15) the axial upper edge 32X of the grinding ring 32. In one embodiment, the ramp 49, including the lower ramp end 49B and upper ramp end 49U, is positioned radially outward of an inner radial edge (e.g., proximate the grinding surface 46) of the grinding ring 32. While the weld 22W is shown and described as securing the upper ramp end 49U to the inside surface 20D and the weld 32W is shown securing the lower ramp end 49B to the axial upper edge 32X of the grinding ring 32, the present invention is not limited in this regard as other configurations may be employed including but not limited to the use of mechanical fasteners, a ramp integrally formed with the inside surface 20D or the grinding ring 32; the ramp 49 can be spaced apart from the grinding ring 32 and/or the ramp 49 can be secured to the inside surface 20D and/or the grinding ring 32 with one or more brackets, fixtures or covers. As shown in FIG. 14, the lower ramp end 49B of the ramp 49 terminates a distance G30 from an edge of the grinding surface 46. The distance G30 is determined based upon a maximum allowable wear of the grinding ring 32.

Figure 11:
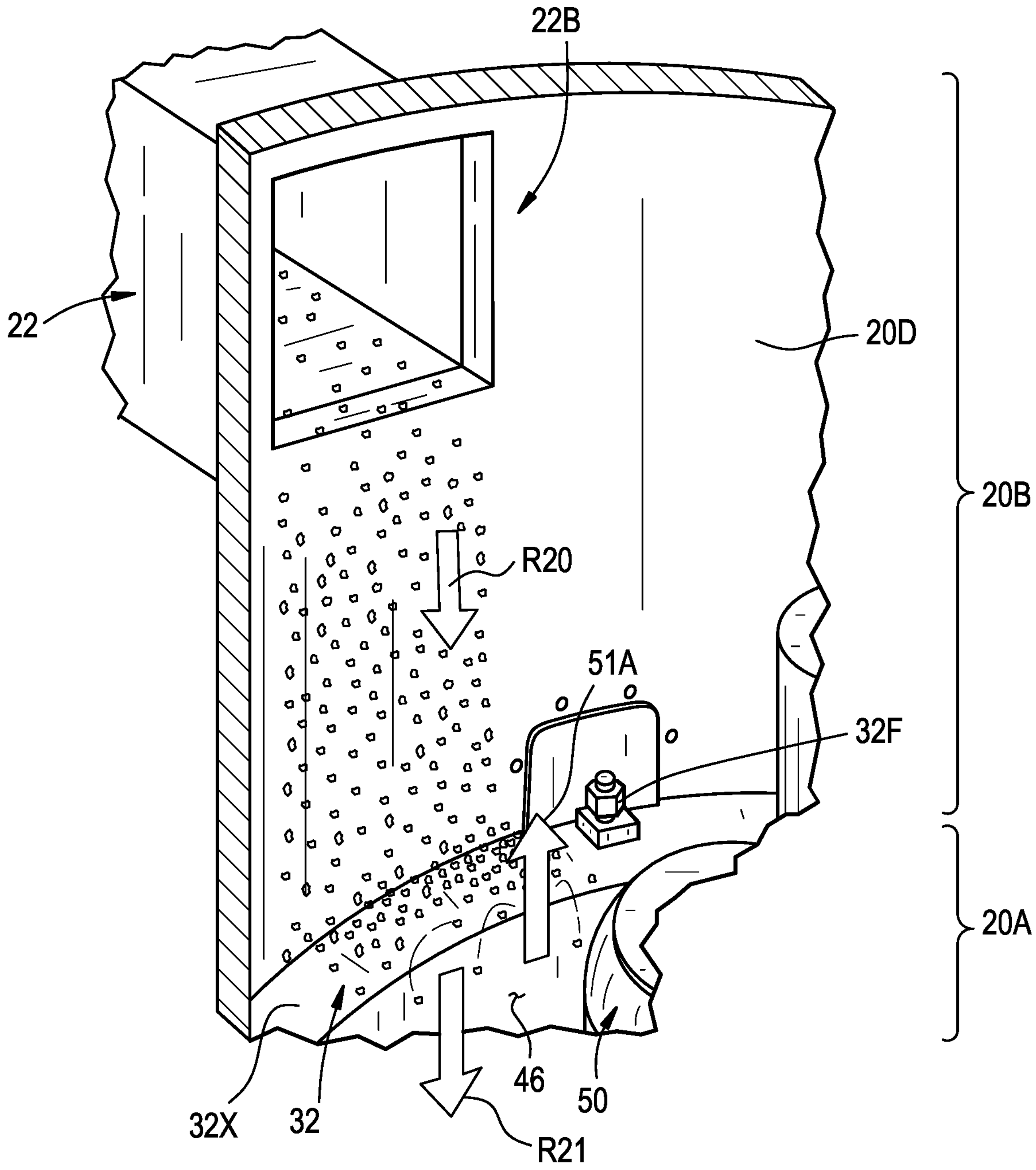
FIG. 11 Prior Art
FIG. 11 is a perspective view of an interior area of a prior art grinding mill.
Figure 13:
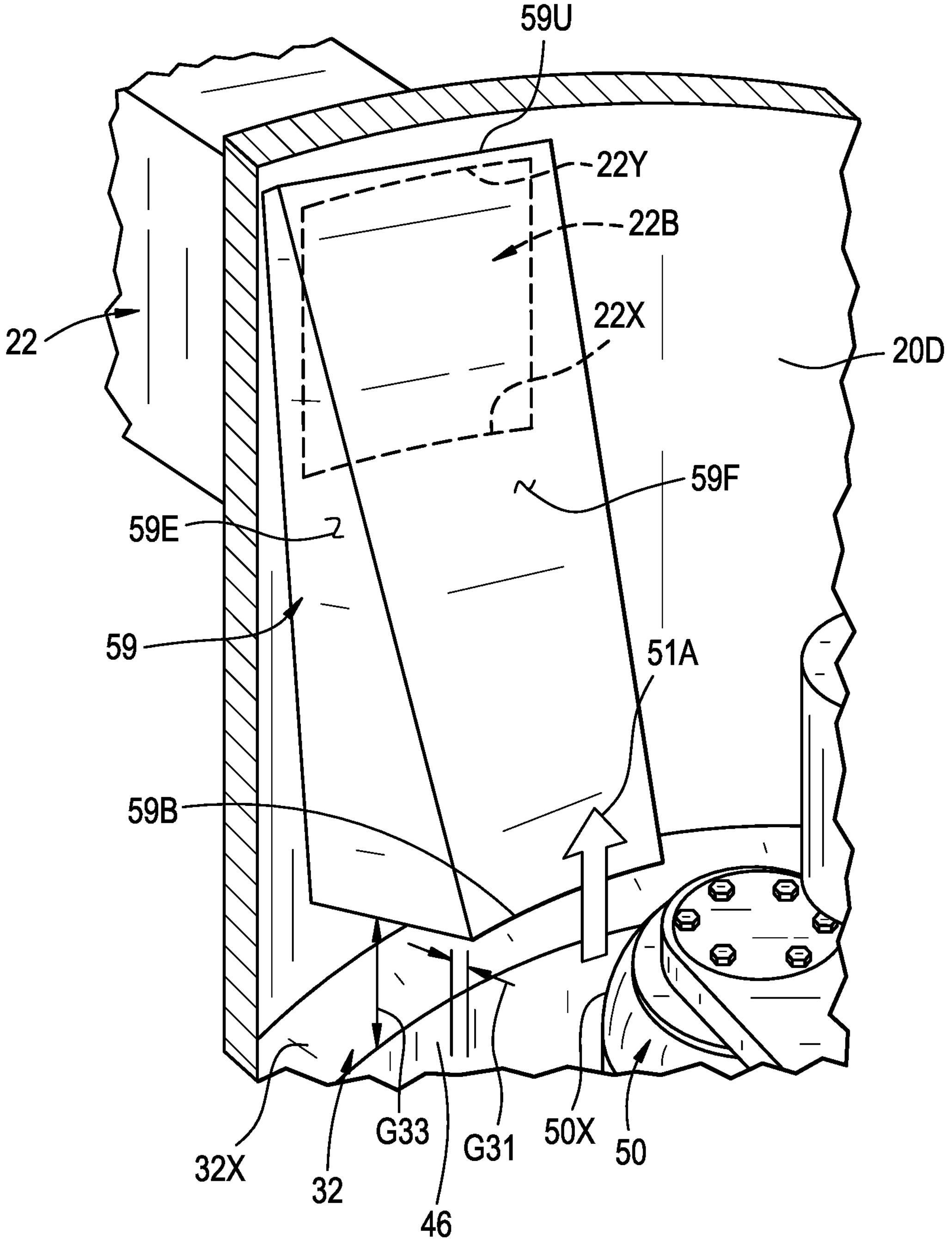
FIG. 13 is a perspective view of the interior area of a grinding mill of shown with a cover installed over the feed outlet.

As shown in FIG. 14, a cover 59 is positioned over the ramp 49 and the feed outlet 22B. While the cover 59 is shown and described with reference to FIG. 14 as being positioned over the ramp 49 and the feed outlet 22B, the present invention is not limited in this regard as the cover 59 may be positioned over the feed outlet 22B and the ramp 49 may be eliminated, as shown in FIG. 13. As shown in FIGS. 13 and 14, the cover 59 includes a sloped surface 59F (e.g., a front sloped wall) supported by opposing side walls 59E (e.g., two opposing triangular shaped side walls secured to the inside surface 20D and the sloped surface 59F)). The sloped surface 59F slopes downward and radially inward from a top cover end 59U thereof. The sloped surface 59F terminates at a bottom cover end 59B of the cover 59. In one embodiment, the bottom cover end 59B terminates a distance G33 above the axial upper edge 32X of the grinding ring 32. In one embodiment, the distance G33 is zero and the bottom cover end 59B terminates at a horizontal plane that is coplanar with the axial upper edge 32X of the grinding ring 32. The bottom cover end 59B of the cover 59 extends radially inward from the grinding surface 46 by a distance G31 to allow ample area for discharge of the material to be ground. While the bottom cover end 59B of the cover 59 is shown and described as extending radially inward from the grinding surface 46, the present invention is not limited in this regard as the bottom cover end 59B of the cover 59 may terminate radially outward from the grinding surface 46. As shown in FIG. 14, the cover 59 has the top cover end 59U that is secured to the inside surface 20D at a position (e.g., by a distance G50) above the upper edge 22Y of the feed outlet 22B. However, the present invention is not limited in this regard as the top cover end 59U can be secured to the inside surface 20D proximate to the upper edge 22Y of the feed outlet 22B, as shown in FIG. 13. The cover 59 extend over the entire extent of the feed outlet 22B from the upper edge 22Y to the bottom edge 22X and continues down and radially inward from the bottom edge 22X. The Applicant has discovered that where the grinding section 20A is directly below the outlet of the material feed, that the cover 59 illustrated in FIGS. 13 and 14 is aerodynamic, minimizes disruption to the air flow, and has utility for grinding and drying fine feed materials such as synthetic gypsum, natural gypsum (i.e., Spanish fine), clay, or limestone, which contains more than 25% fine particle sizes of 1 mm or less. The Applicant has discovered that the ramp 49 and the cover 59 cooperate with each other and the inside surface 20D to provide a direct and unobstructed flow path R22 between the feed outlet 22B and the grinding section 20A for the material to be ground. The ramp 49 and the cover 59 allow the material to be ground to travel more quickly from the feed outlet 22B to the grinding section 20A, compared to a configuration as shown in FIG. 11 that has no ramp or cover. The Applicant has further discovered that use of the ramp 49 and the cover 59 cooperate to reduce the quantity of material carried away by the updraft 51A, thereby increasing the percentage of material discharged through the feed outlet 22B that enters the grinding section 20A, compared to a configuration as shown in FIG. 11 that has no ramp and no cover. In some embodiments, the cover 59 cooperates with the inside surface 20D to provide a direct and unobstructed flow path R22 between the feed outlet 22B and the grinding section 20A for the material to be ground.

Figure 15:
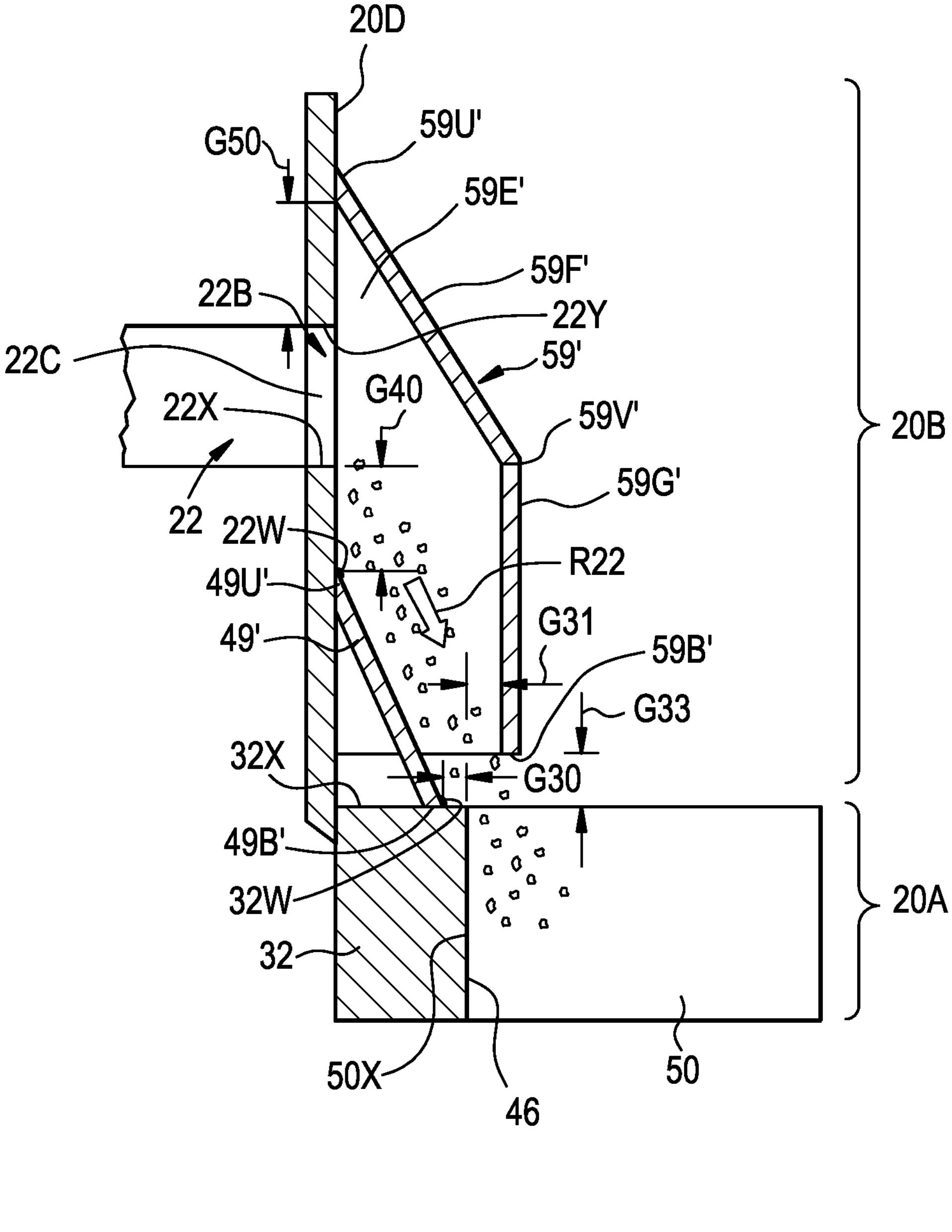
FIG. 15 is a cross sectional view of another embodiment of a ramp and cover installed in a grinding mill.

FIG. 15 illustrates another embodiment of a ramp 49' and cover 59' that results in a greater interior area compared to that created by the ramp 49 and cover 59 configuration of FIGS. 12 and 14. The ramp 49' has an upper ramp end 49U' that is secured to the inside surface 20D at a position between the bottom edge 22X of the feed outlet 22B and the axial upper edge 32X of the grinding ring 32. Thus, the upper ramp end 40U' is secured to the inside surface 20D at a position below the bottom edge 22X by a distance G40, as shown in FIG. 15. The lower ramp end 49B' is configured similar to the lower ramp end 49B of the ramp 49 and is secured to the axial upper edge 32X of the grinding ring 32 and/or the inside surface 20D similar to the described for the lower ramp end 49B shown in FIG. 14. The cover 59' includes a sloped surface 59F' that extends downward and radially inward from a top cover end 59U' thereof. The sloped surface 59F' transitions into a vertical surface 59G'. The vertical surface 59G' terminates at a bottom cover end 59B' of the cover 59'. In one embodiment, the bottom cover end 59B' terminates a distance G33 above the axial upper edge 32X of the grinding ring 32. In one embodiment, the distance G33 is zero and the bottom cover end 59B' terminates at a horizontal plane that is coplanar with the axial upper edge 32X of the grinding ring 32. The bottom cover end 59B' extends radially inward from the grinding surface 46 by a distance G31 to allow ample area for discharge of the material to be ground. The cover 59' has the top cover end 59U' that is secured to the inside surface 20D at a position (e.g., by a distance G50) above the upper edge 22Y of the feed outlet 22B.

The Applicant has discovered that the cover 59', illustrated in FIG. 15, is aerodynamic, minimizes disruption to the air flow, and has utility for fine grinding limestone with fine feed sizes. The Applicant has discovered that the ramp 49' and the cover 59' cooperate to provide a direct and unobstructed flow path R22 between the feed outlet 22B and the grinding section 20A for the material to be ground. The ramp 49' and the cover 59' allow the material to be ground to travel more quickly from the feed outlet 22B to the grinding section 20A, compared to a configuration as shown in FIG. 11 that has no ramp or cover. The Applicant has further discovered that use of the ramp 49' and the cover 59' cooperate to reduce the quantity of material carried away by the updraft 51A (see e.g., FIG. 13), thereby increasing the percentage of material discharged through the feed outlet 22B that enters the grinding section 20A, compared to a configuration as shown in FIG. 11 that has no ramp or cover.

In one embodiment, the ramp 49 or 49' is secured (e.g., welded) to the cover 59 or 59' to create an integral one piece ramp and cover assembly. In one embodiment, the side walls 59E or 59E' flare outwardly from the cover 59 or 59'. In one embodiment, the side walls 59E or 59E' have flanges extending outwardly therefrom. In one embodiment, the cover 59 or 59'; the ramp 49 or 49'; and/or the integral one piece ramp and cover assembly are removably secured to the inside surface 20D. For example, in one embodiment, clamps and lugs are secured to the inside surface 20D and the flange slides into the clamps and the cover 59 or 59' seat on the lugs so that the cover 59 or 59' and/or the ramp 49 or 49' are removably secured to the inside surface 20D and located at a predetermined position from the grinding ring 32.

Figure 5:
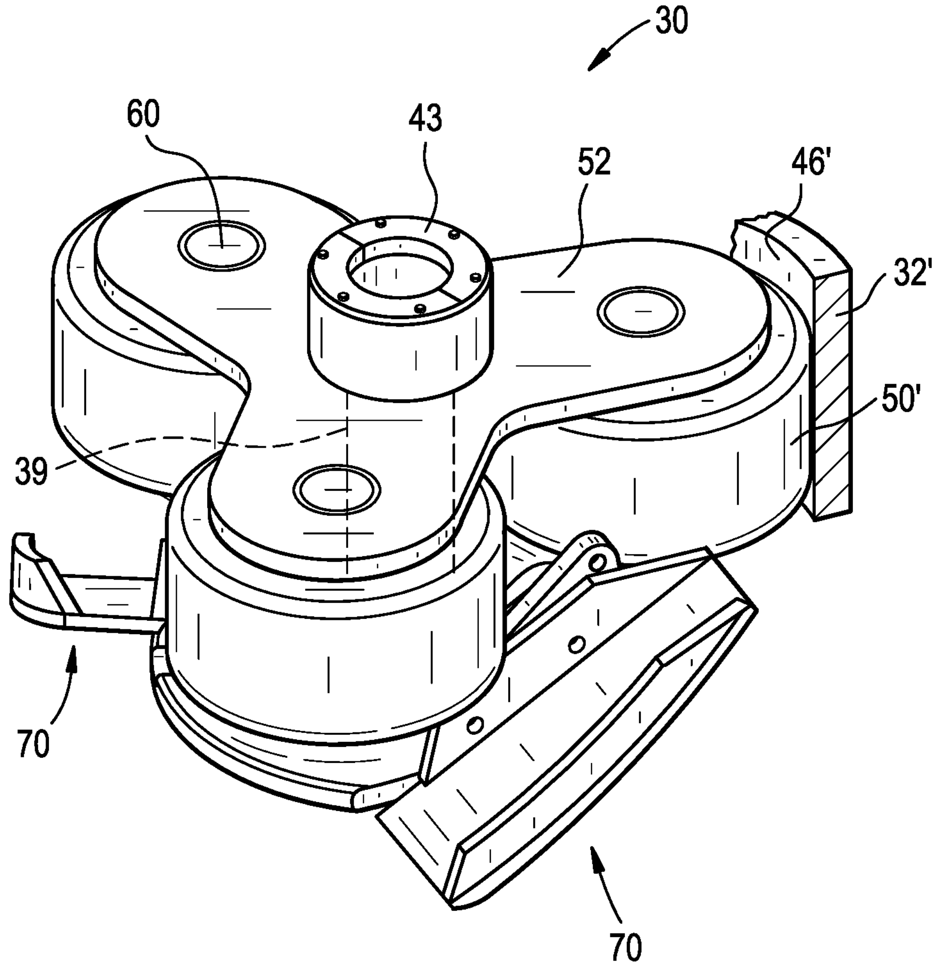
FIG. 5 is a perspective view of the three roller embodiment of the planetary roller mill of the present invention.
Figure 6:
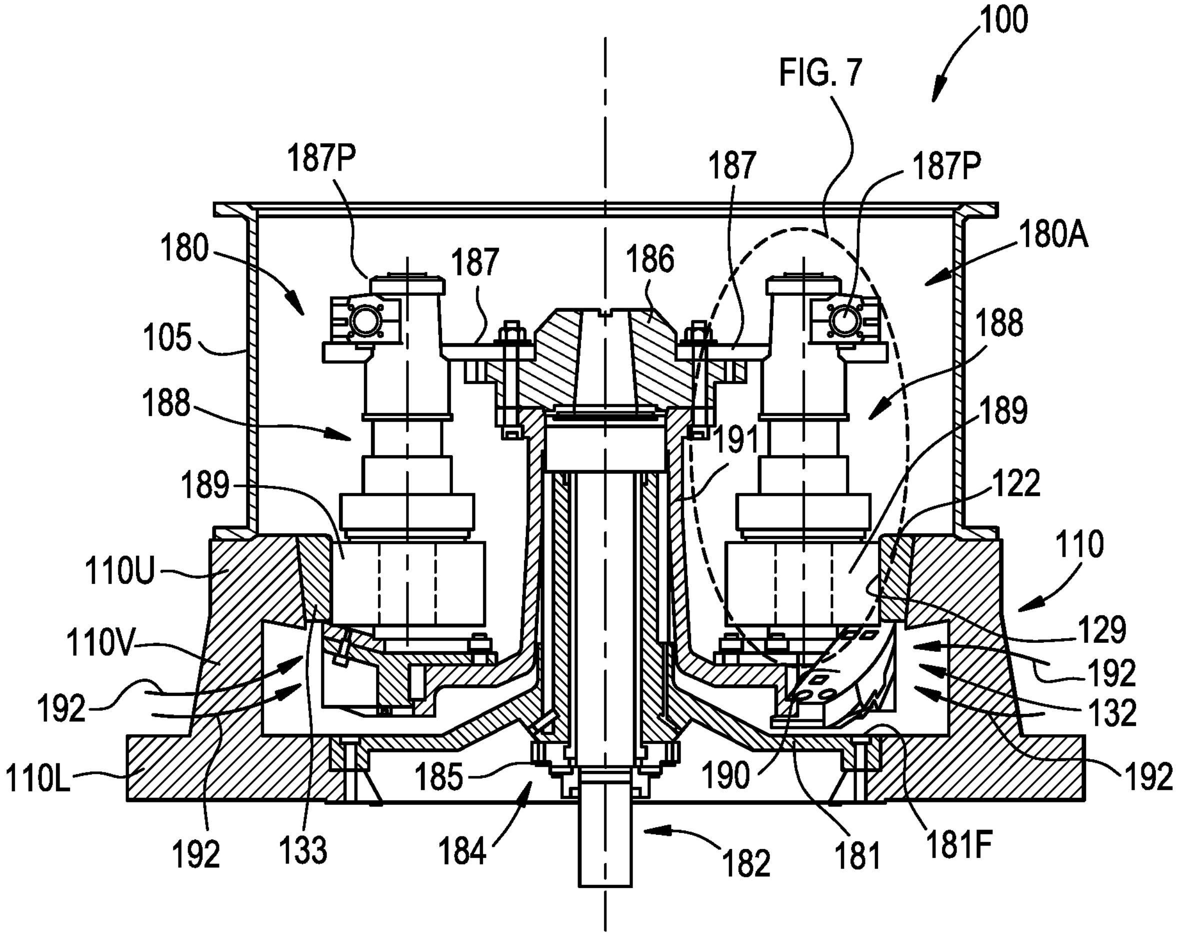
FIG. 6 PRIOR ART
FIG. 6 is a cross sectional view of a prior art pendulum roller mill.
Figure 7:
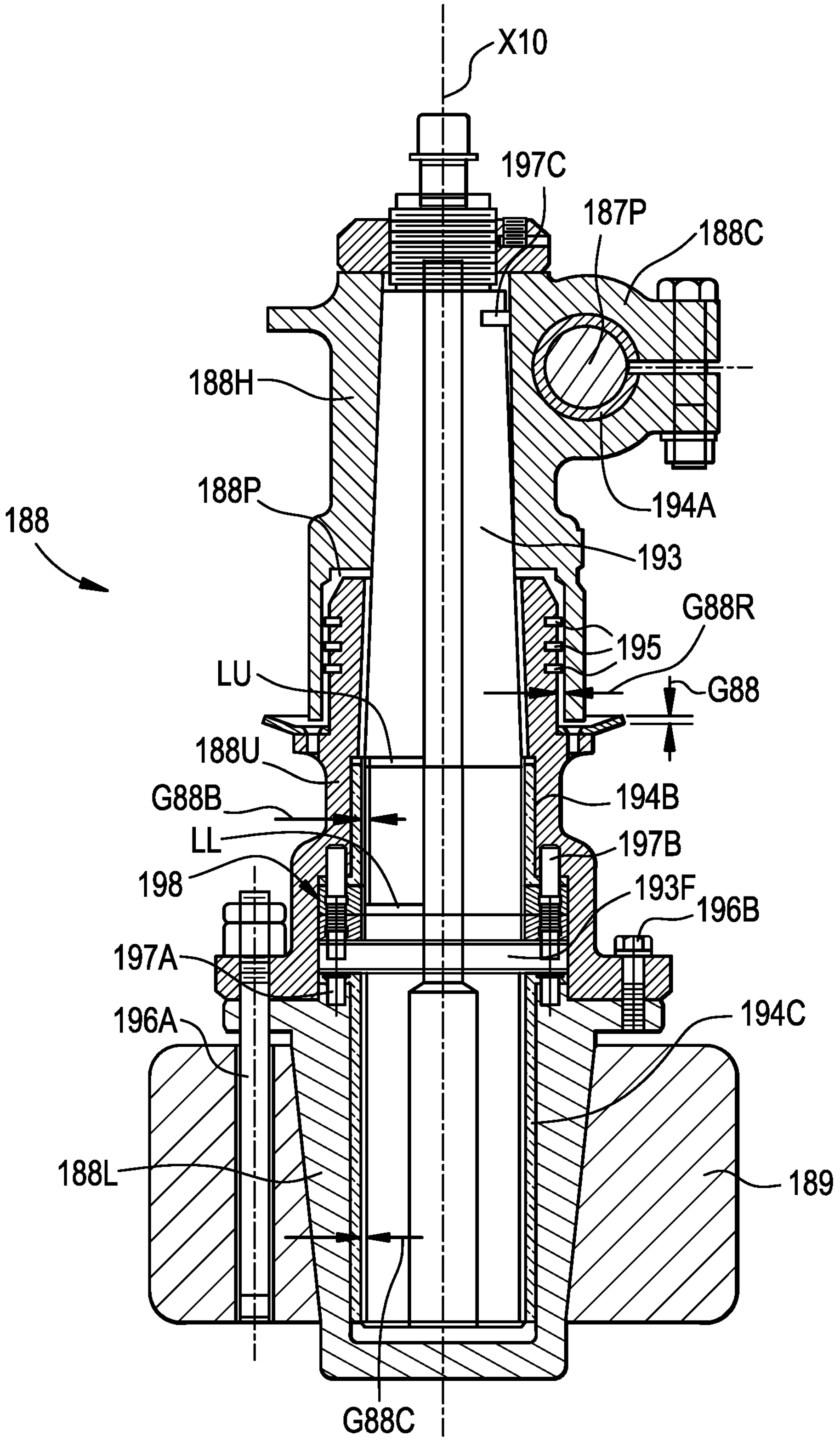
FIG. 7 PRIOR ART
FIG. 7 is an enlarged cross sectional view of one of the pendulum and roller assemblies of FIG. 6.

The Applicant has discovered that the ramps 49 and 49' and/or the covers 59 and 59' can be employed in the planetary roller mills 10 illustrated in FIGS. 1A, 1B, 2A-2F, 3A-3C, 4A, 4B, and 5 as well as the pendulum mills of FIGS. 6 and 7. They may also be used in any other configuration of grinding mill where fine feed raw material is to be gravity fed from an outlet port toward a grinding section 20A.

As shown in FIG. 1A, a grinding assembly 30 is positioned in the grinding section 20A of the vessel assembly 20 below the feed outlet 22B. The grinding assembly 30 includes the annular grinding ring 32 that is secured to the inside surface 20D of the vessel assembly 20 via suitable fasteners 32F. The grinding ring 32 has an outside surface 32Q that is arranged in sealing engagement with the inside surface 33Y of a support ring 33 of the vessel assembly 20. Thus, there is no annular gap between the grinding ring 32 and the support ring 33 of the grinding section 20A of the vessel assembly 20 for air to flow through and bypass the grinding assembly 30. In one embodiment, the grinding ring 32 is a continuous annular ring with no circumferential openings or material feed inlets extending therethrough. A plurality of vanes 34 are positioned between the support ring 33 and a base plate 36 that is secured to the frame 21. The vanes 34 are positioned below the grinding assembly 30 and extend an angled length from a position radially outward from the grinding ring 32 to a position radially inward from the grinding ring 32. The vanes 34 are positioned in a circumferential configuration around the support ring 33.

Adjacent pairs of the vanes 34 define channels 35 (e.g., nozzles) therebetween for conveying heated air designated by the arrows 35A into the grinding assembly 30 at velocities and flow rates sufficient to dry and/or calcining the material to be ground, as described herein.

As shown in FIG. 1A, the vessel assembly 20 includes an air supply manifold 45 that has an inlet 45A that extends into a circumferential duct 45B that surrounds and opens into the grinding section 20A as described herein. In one embodiment, the outlet of the air supply manifold 45 is connected to a bottom portion of the opening 44 of the grinding ring 32, axially beneath the plurality of rollers 50.

Figure 3A:
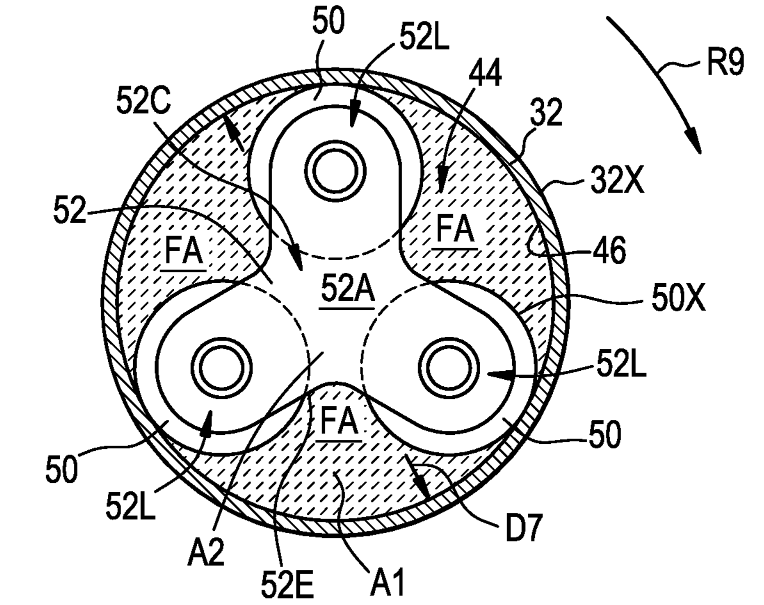
FIG. 3A is a top view of an embodiment of the grinding assembly of the planetary roller mill of the present invention having three rollers.
Figure 4A:
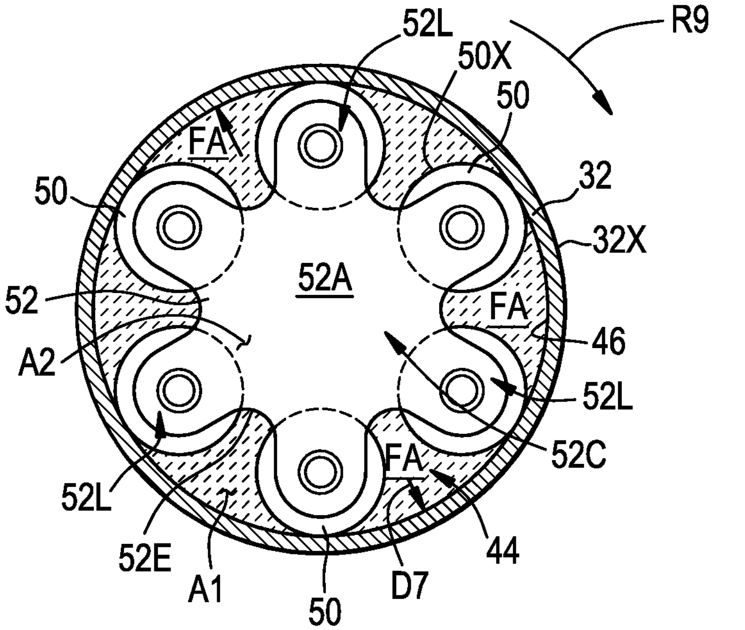
FIG. 4A is a top view of an embodiment of the grinding assembly of the planetary roller mill of the present invention having six rollers.

As best shown in FIGS. 3A and 4A the grinding ring 32 has an opening 44 extending therethrough from the axial upper edge 32X to an axial lower edge 32Y thereof. The opening 44 is defined by a radially inward facing grinding surface 46 and having a first area A1. The first area A1 is the area defined by the equation $A1=\pi/4\ (D7)^2$, where D7 is the nominal inside diameter of the grinding ring 32 measured at the radially inward facing grinding surface 46.

Referring to FIGS. 1A, 2A, 2E and 2F, the grinding assembly 30 includes a drive shaft 39 rotatably mounted to the frame 21. A hub 43 is secured to an upper portion of the drive shaft 39 by a key connection (not shown). The hub 43 includes a flange 43F on a lower end thereof. The grinding assembly 30 includes a sleeve 43C that extends axially downward from another flange 43G. A shim stack 43J is positioned between the flange 43F and the flange 43G. A plurality of fasteners secure the flanges 43F and 43G to one another. A plurality of gussets 47 are secured to and extend radially from the sleeve 43C. The shim stack 43J includes a predetermined number of shims (e.g., annular discs, for example 0.0625 inches (1.5875 mm) thick). Variation of the number of shims in the shim stack 43J adjusts the vertical position of the rollers 50 relative to the grinding ring 32, as described herein. While the shim stack 43J is shown and described as being employed to adjust the vertical position of the rollers 50 relative to the grinding ring 32, the present invention is not limited in this regard as other means for adjusting the rollers 50 relative to the grinding ring 32 may be employed including but not limited to washers and jacking screws or indeed by appropriate sizing of parts determining the position of the rollers 50 relative to the grinding ring 32.

Figure 2A:
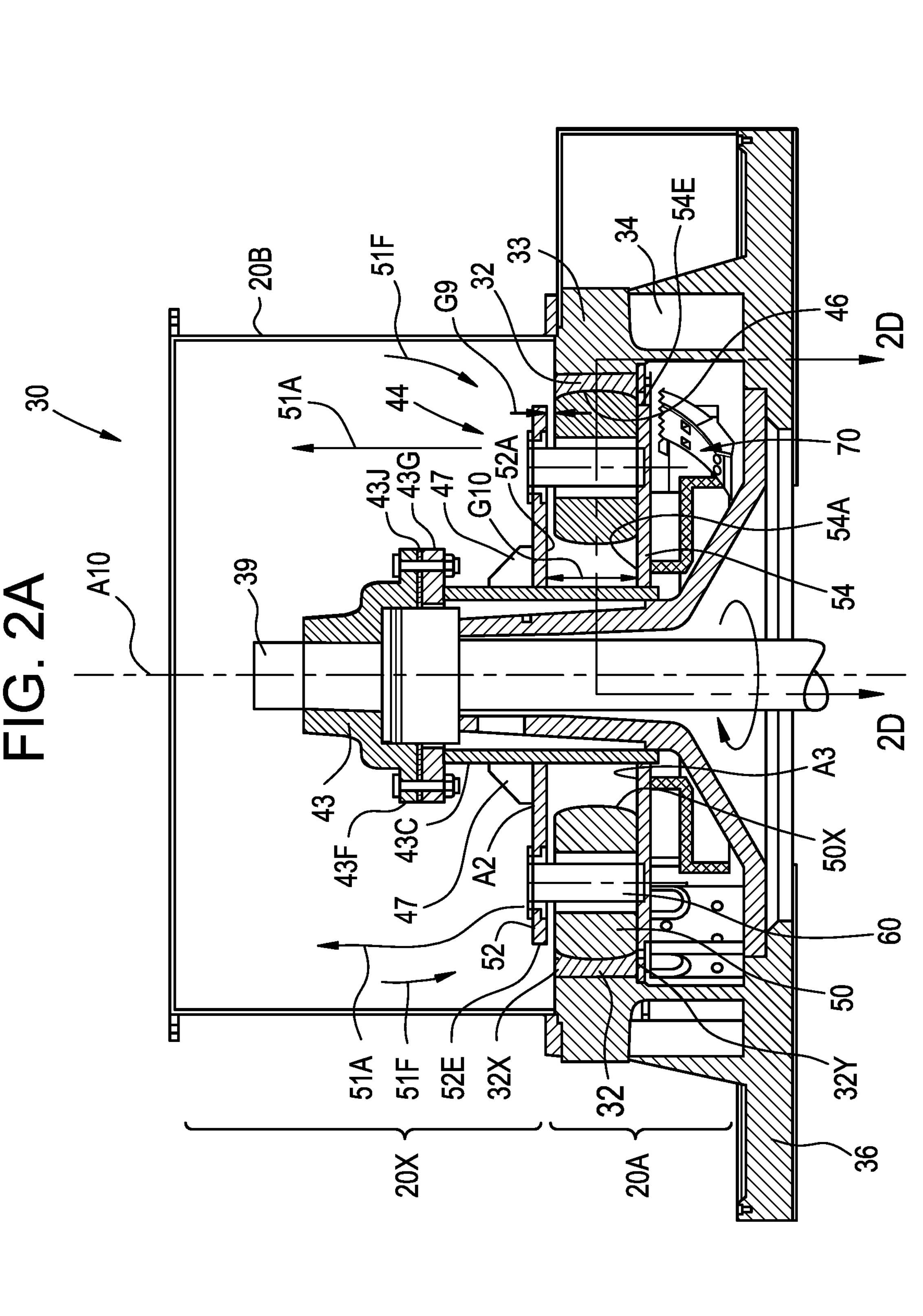
FIG. 2A is a cross sectional view of the planetary roller mill of FIG. 1A, taken across line 2A-2A.
Figure 2B:
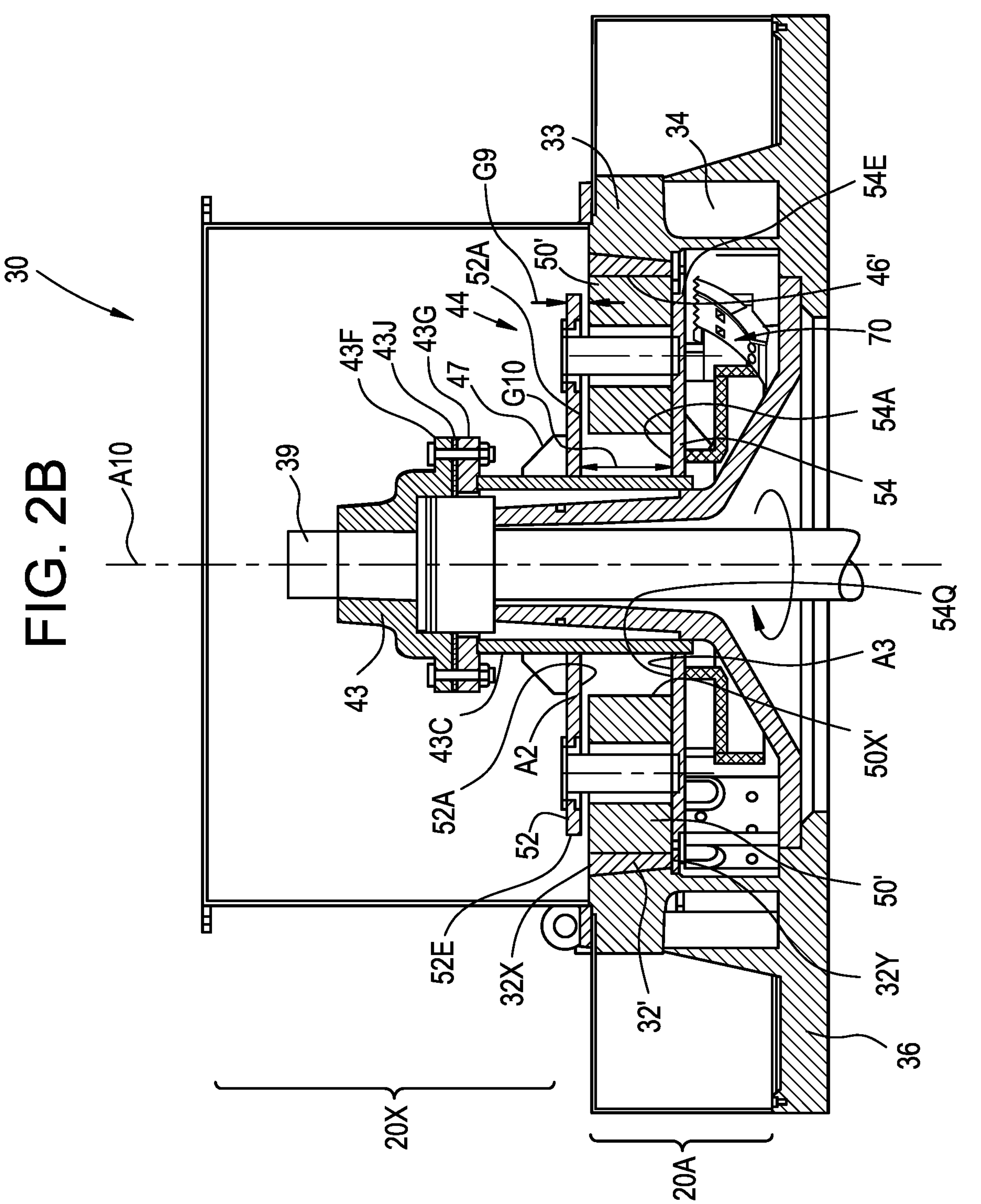
FIG. 2B is a cross sectional view of the planetary roller mill of FIG. 1B, taken across line 2B-2B.
Figure 2C:
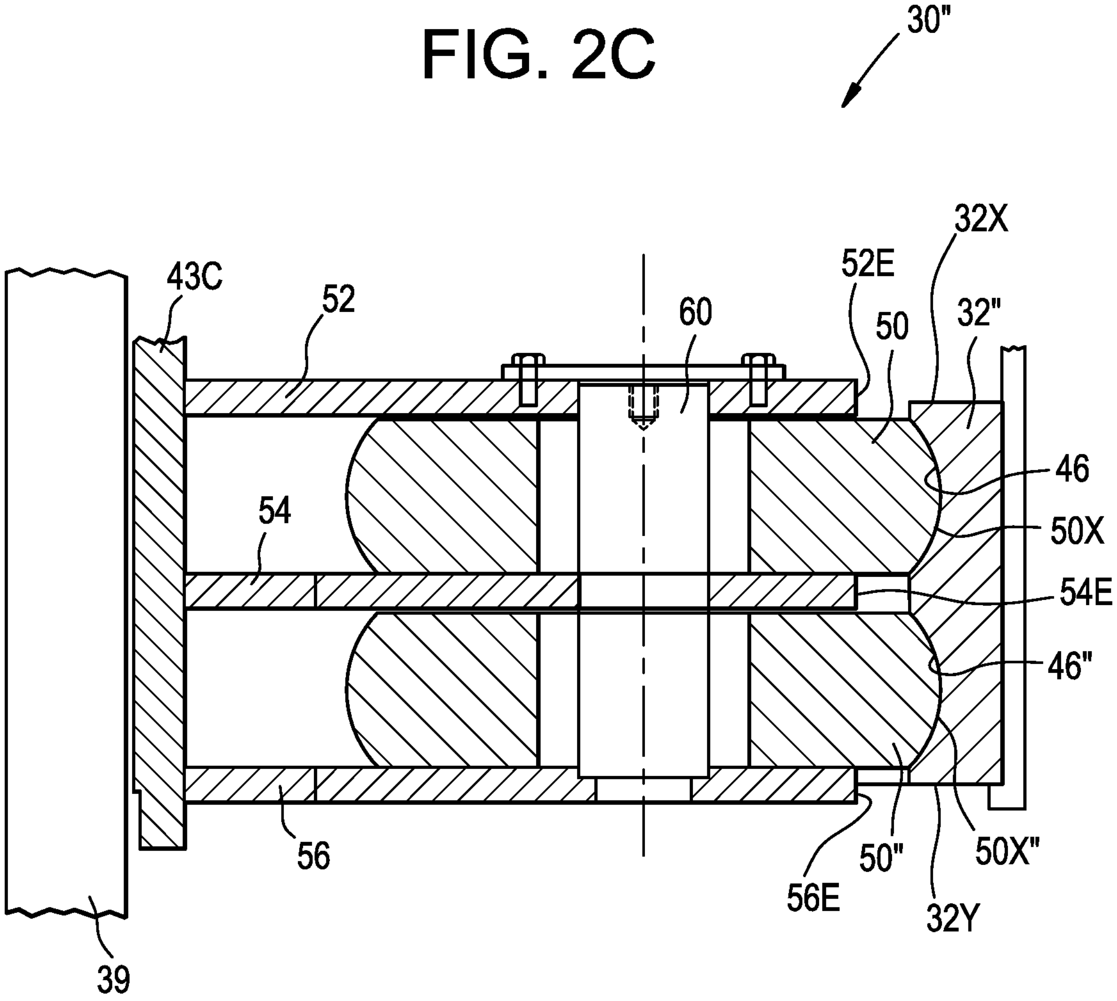
FIG. 2C is a cross sectional view of a portion of a planetary roller mill with two layers of the contoured rollers.
Figure 2D:
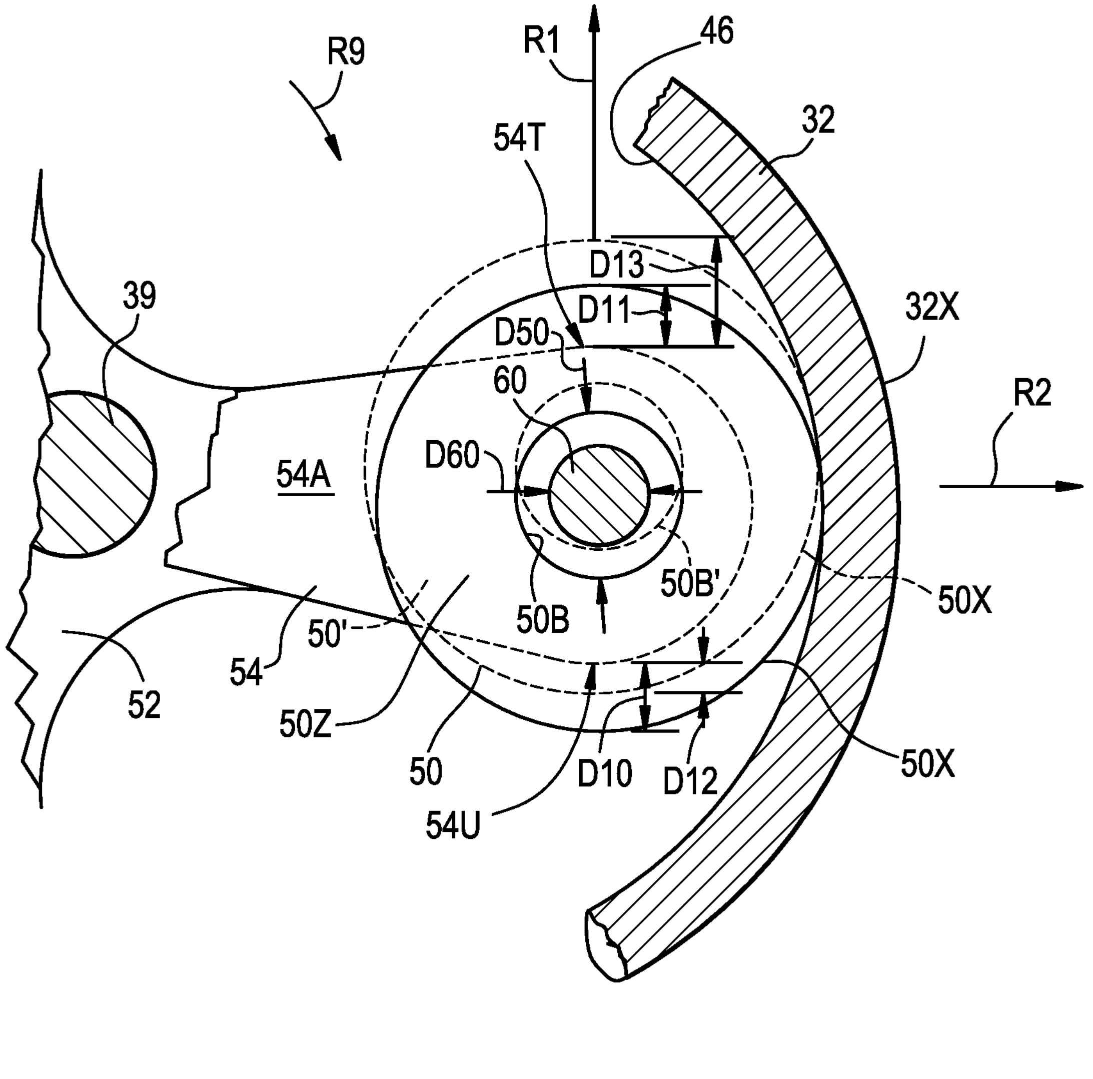
FIG. 2D is an enlarged cross sectional view of one of the rollers of FIG. 2A taken across line 2D-2D.
Figure 2E:
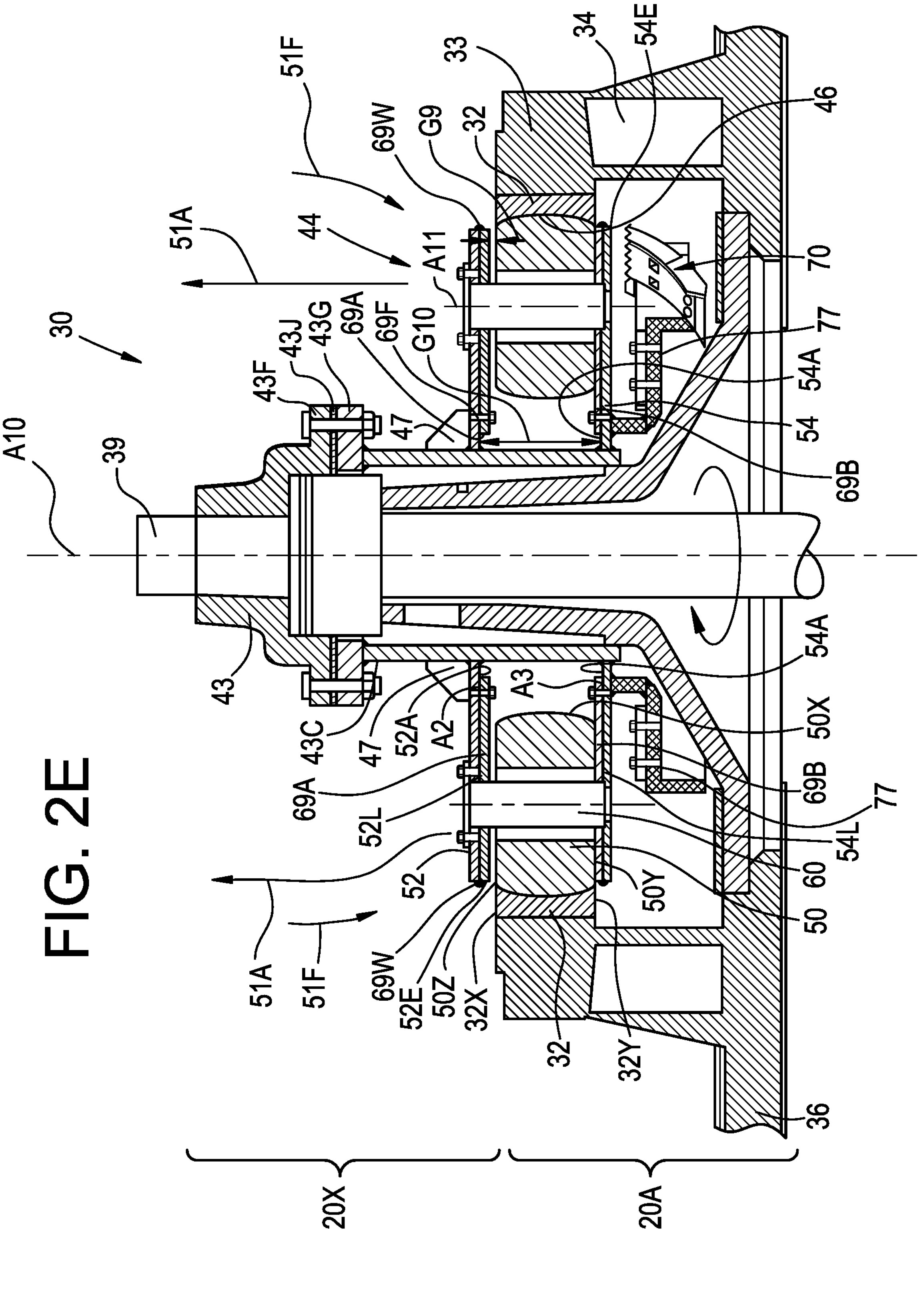
FIG. 2E is cross sectional view of another embodiment of the planetary roller mill of the present invention with contoured rollers, wear plates and an alternative plow mounting configuration.
Figure 3B:
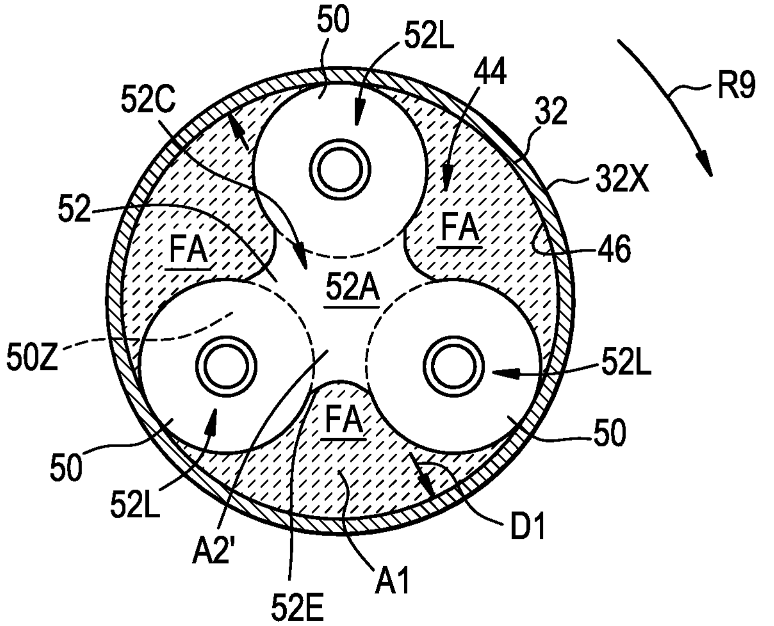
FIG. 3B is a top view of another embodiment of the grinding assembly of the planetary roller mill of the present invention having three rollers.
Figure 4B:
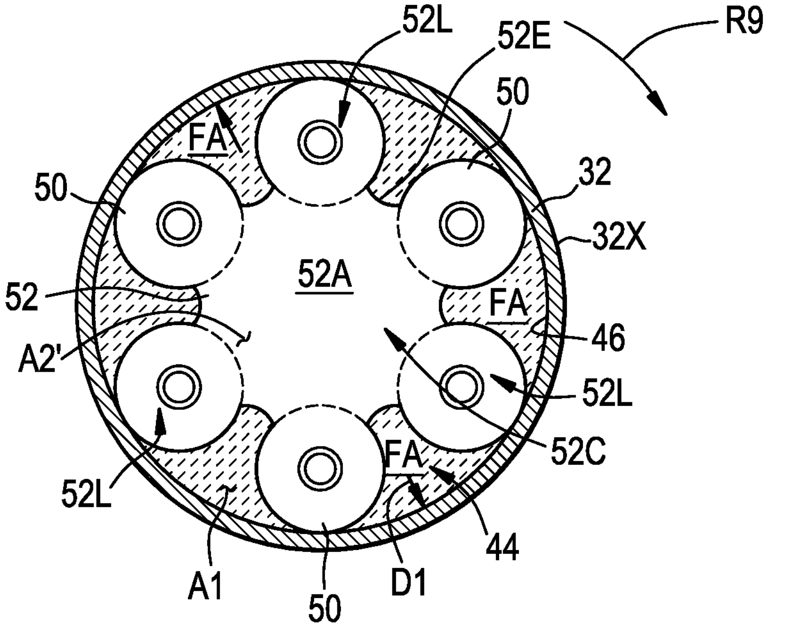
FIG. 4B is a top view of an embodiment of the grinding assembly of the planetary roller mill of the present invention having six rollers.

As shown in FIGS. 1A, 2A, 2E and/or 2F, the grinding assembly 30 includes a first support plate 52 secured to the shaft 39 via the hub 43, the sleeve 43C and the gussets 47. The first support plate 52 has a first axially facing surface 52A defining a second area A2. The first support plate 52 is of a generally non-circular shape configured to establish an optimum magnitude of the area A2. In one embodiment, as shown in FIGS. 3B and 4B, the area A2' of the first support plate 52 is increased over the area A2 shown in FIGS. 3A and 4A, by extending the area A2' outwardly to cover an entire axial end 50Z of each of the rollers 50, without reducing the flow area FA. Use of the increased area A2' reduces the contact pressure between the axial end 50Z and the first axially facing surface 52A (i.e., underside) of each of the lobes 52L. While the area A2' of the first support plate 52 is shown and described as being increased, the present invention is not limited in this regard as the area of the second support plate 54 can be increased in a manner similar to that described for the first support plate 52. The Applicant has discovered that circular shaped support plates are not suitable to provide the optimum magnitude of the area A2. In one embodiment, as shown in FIG. 3A, the support plate 52 has a central area 52C with three lobes 52L extending radially outwardly therefrom. While FIG. 3A illustrates the support plate 52 having three lobes 52L, the present invention is not limited in this regard as the support plate may have any number of lobes, for example, as shown in FIG. 4A, the support plate 52 has the central area 52C with six lobes 52L extending radially outwardly therefrom.

As shown in FIGS. 1A, 2A, 2E and 2F the grinding assembly 30 includes a second support plate 54 secured to the shaft 39 via the hub 43, the sleeve 43C and the gussets 47. The second support plate 54 has a second axially facing surface 54A defining a third area A3. The second support plate 54 is of a generally non-circular shape configured to establish an optimum magnitude of the area A3. The Applicant has discovered that circular shaped support plates are not suitable to provide the optimum magnitude of the area A3. The second support plate 54 is spaced axially apart from the first support plate 52 by a gap G10. The second support plate 54 is configured in a shape similar to that shown (e.g., FIGS. 3A, 3B, 4A and 4B) and described for the first support plate 52.

As shown in FIGS. 1A and 2A, a plurality of rollers 50 are rotatably mounted to and positioned between the first support plate 52 and the second support plate 54. Adding shims to the shim stack 43J causes the sleeve 43C, the first and second support plates 52 and 54 and the rollers 50 to move vertically downward to vertically align the rollers 50 in the grinding ring 32. Reducing the number shims in the shim stack 43J causes the sleeve 43C, the first and second support plates 52 and 54 and the rollers 50 to move vertically upward to vertically align the rollers 50 in the grinding ring 32.

As shown in FIG. 2D, the first support plate 52 is shown in a cut away view to expose the axial end 50Z of the roller 50. Each of the plurality of rollers 50 is configured to move between the first and second support plates 52 and 54, for example move between the first and second support plates 52 and 54 in the direction of the arrow R1, (as shown by the dashed lines 50 version of the roller 50) as a result of rotation of the shaft 39 in the clockwise direction of the arrow R9. Each of the plurality of rollers 50 has a bore 50B extending axially therethrough. The bore 50B has an inside diameter D50. Each of the plurality of rollers 50 is mounted on a pin 60 secured to and extending between the first support plate 52 and the second support plate 54 in the area of the respective lobe 52L (e.g., FIGS. 3 and 4). Referring back to FIG. 2D, the pin 60 has an outside diameter D60 that is less than the inside diameter D50 of the bore 50B. Each of the plurality of rollers has a radially outer surface 50X. Due to rotation of the shaft 39 in the clockwise direction R9, the roller 50 moves circumferentially backward towards a trailing edge 54T of the second support plate 54 and away from the pin 60 as shown by the arrow R1. As a result of the rotation of the shaft 39 the roller 50 moves between the first and second support plates 52 and 54. For example, the roller 50 moves between the first support plate 52 and the second support plate 54 in the direction of the arrow R1 (see FIG. 2D) to the roller position indicated by the dashed lines 50 so that the radially outer surface 50X is in grinding communication with the grinding surface 46 of the grinding ring 32, for example, the outer surface 50X' rollingly engages the grinding surface 46 of the grinding ring 32 or the outer surface 50X' is in sufficient proximity to the grinding surface 46 of the grinding ring 32 to effectuate grinding. In one embodiment, as a result of the rotation of the shaft 39, the roller 50 is forced radially outward in the direction of the arrow R2 by centrifugal force to increase the contact pressure between the outer surface 50X of the roller and the grinding surface 46. If the roller 50 encounters very large or abnormally hard chunks of material, the roller 50 may temporarily move radially inward in a direction opposite to the arrow R2.

As shown in FIG. 2D, when the shaft 39 is not rotating, the roller may attain a neutral state wherein the bore 50B is centered around the pin 60. In the neutral state the radially outer surface 50X of the roller 50 is equidistant from lateral edges of the lobes 52L and 54L, as indicated by the distances D10 and D11. However, when the shaft 39 rotates in the direction of the arrow R9, the roller 50 moves in the general direction of the arrow R1. As a result, the radially outer surface 50X of the roller 50 is asymmetrically spaced from the lateral edges (i.e., the leading edge 54U and trailing edges 54T) of the lobes 54L, as indicated by the unequal distances D12 and D13. Since D13 is greater that D12, a lesser area of the second axially facing surface 54A slidingly engages the axial end 50Y (see FIG. 2E, for example) of the roller 50, compared to the neutral position. This results in higher contact pressures and increased wear during operation when the shaft 39 is rotating, compared to a configuration in which a greater percentage of the area of the second axially facing surface 54A slidingly engages the axial end 50Y of the roller 50. While the asymmetric spacing of the lateral edges (i.e., the leading edge 54U and trailing edges 54T) of the lobes 54L relative to the radially outer surface 50X of the roller 50 is shown to decrease the contact area between the second axially facing surface 54A and the axial end 50Y of the roller 50 as shown and described, a similar configuration exists between the axial end 50X of the roller 50 and the first axially facing surface 52A.

Figure 3C:
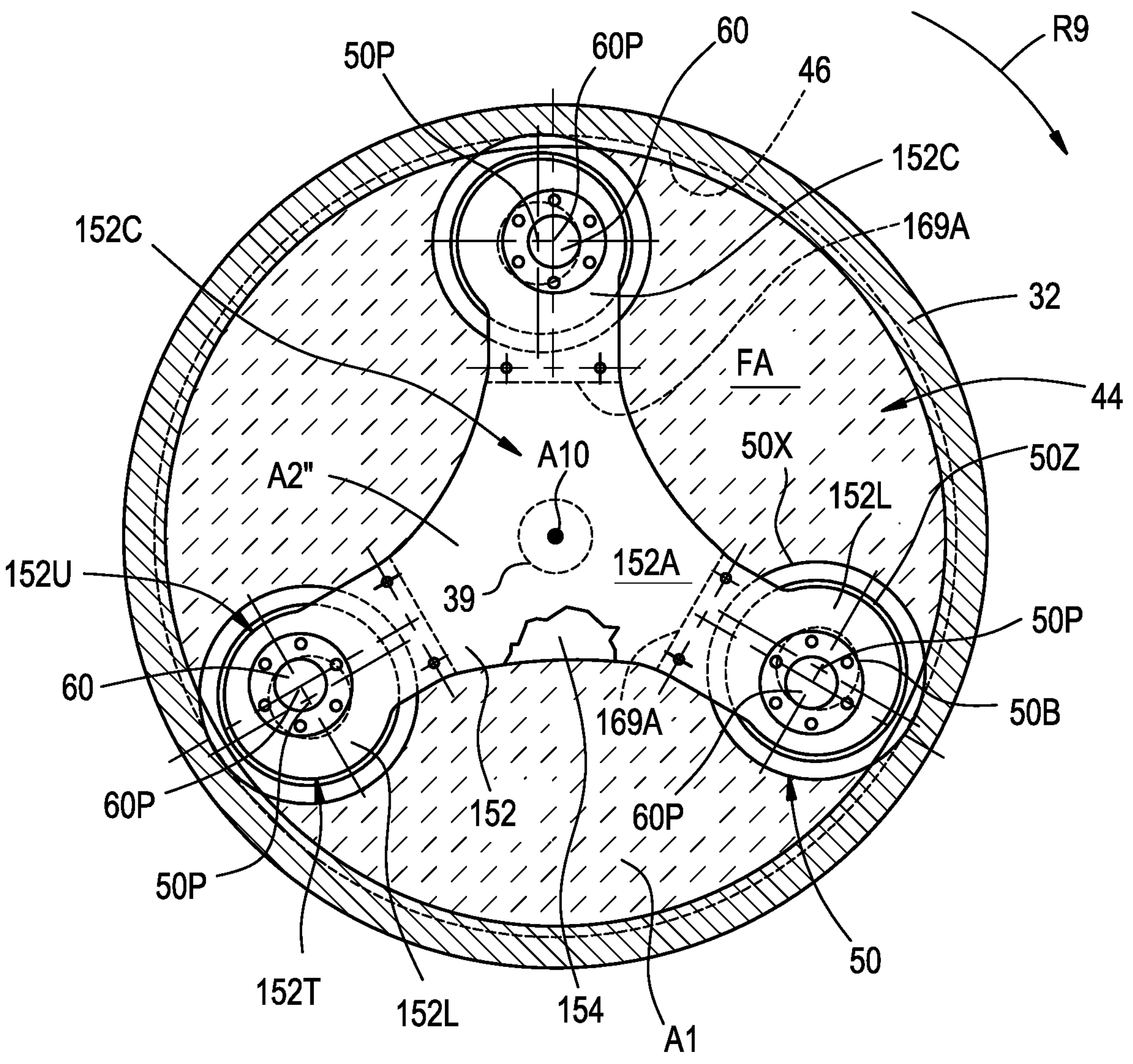
FIG. 3C is a top view of another embodiment of the grinding assembly of the planetary roller mill of FIG. 2A shown with asymmetric support and wear plates.

As shown in FIG. 3C, the support plate 152 is similar to the first and second support plates 52 and 54 of FIGS. 3A and 3B, thus similar elements of the first support plate 52 are designated with similar element numbers preceded by the numeral 1. The rollers 50 shown in FIG. 3C are contoured with convex exterior surfaces 50X, similar to the rollers 50 shown in FIG. 2E.

As shown in FIG. 3C, the area A2" of the first support plate 152 is increased over the area A2 shown in FIG. 3A, by extending the area A2" asymmetrically outwardly to cover a portion of (i.e., less than the area A2' shown in FIG. 3B and greater than the area A2 of FIG. 3A) the axial end 50Z of each of the rollers 50, without reducing the flow area FA. Use of the increased area A2" reduces the contact pressure between the axial end 50Z and the first axially facing surface 152A of each of the lobes 152L, as described herein.

As shown in FIG. 3C, the direction of rotation of the shaft 39, the first support plate 152 and the second support plate 154 (only a portion of the second support plate 154 is shown under the cut away portion of the first support plate 152) is clockwise, relative to the stationary grinding ring 32, is indicated by the arrow R9. The first support plate 152 has a central area 152C that defines a center of rotation about the axis A10. Three lobes 152L extend radially outward from the central area 152C. As shown in FIGS. 3E and 3F, each of the lobes 152L has an asymmetrical shape and an area 152Q (e.g., a recess, an opening or surface) for receiving a roller mounting pin 60. The area for receiving the roller mounting pin 60 has a center point 60P. The asymmetric shape of the lobes 152L is defined by a trailing edge 152T and a leading edge 152U, generally opposite the trailing edge 152T. The trailing edge 152T extends further away from the center point 60P than does the leading edge 152U. For example, as shown in FIG. 3E, the trailing edge 152T extends away from the center point 60P a distance D21 and the leading edge 152U extends away from the center point 60P by a distance D20. The distance D21 is greater than the distance D20.

As shown in FIGS. 3E and 3F, the lobe 152L has a straight section 152V that transitions at transition point R12 to the trailing edge 152T. The trailing edge 152T transitions into the leading edge 152U which transitions into a straight section 152W at transition point R13. The trailing edge 152T and the leading edge 152U have has a radius of curvature R15 measured from a center point 152P of the lobe 152L. The transition point R12 is located at about a 10 o'clock to 11 o'clock position; and the transition point R13 is located at about a 7 o'clock position.

As shown in FIG. 3F, the center point 60P is positioned on the lobe 152L such that during rotation of the support plate in a direction from the trailing edge 152T to the leading edge 152U (i.e., in the direction of the arrow R9), the lobe 152L is configured to cover at least a portion of the axial end 50Z of the roller 50, adjacent to the leading edge 152U and the trailing edge 152T, thereby leaving the arcuate segment 157A of the axial end 50Z uncovered. As shown in FIG. 3F, the uncovered segment 157A extends around the lobe 152L from the transition point R12 to the transition point R13 at a substantially uniform width W57 between an edge of the axial end 50Z of the roller 50 and a transition 50ZZ to the exterior surface 50Z of the roller 50. Thus, as shown in FIG. 3F the lobe 152L covers a portion of the axial end 50Z adjacent to the leading edge 152U and the trailing edge 152T.

As shown in FIG. 3E, the center point 60P is positioned on the lobe 152L such that in a neutral state with the center point 60P positioned coaxially with the axial center line 50P of the roller 50. The lobe 152L is configured to cover at least a portion of the axial end 50Z of the roller 50, adjacent to the leading edge 152U but none or less of the axial end 50Z adjacent to the trailing edge 152T, thereby leaving the arcuate segment 157B of the axial end 50Z, uncovered. As shown in FIG. 3E, the uncovered arcuate segment 157B extends around the leading edge 152U of the lobe 152L a non-uniform width W56 between an edge of the axial end 50Z of the roller 50 and a transition 50ZZ to the exterior surface 50Z of the roller 50. Thus, as shown in FIG. 3E the lobe 152L covers a portion of the axial end 50Z adjacent to the leading edge 152U. As shown in FIG. 3F, in the rotating state, the roller 50 moves in the direction of the arrow R1 and an uncovered segment 157A extends around the leading edge 152U and trailing edge 152T of the lobe 152L a uniform width W57 between an edge of the axial end 50Z of the roller 50 and a transition 50ZZ to the exterior surface 50Z of the roller 50.

The Applicant has discovered that use of the asymmetric shape of the lobe 152L disclosed herein allows the bore 50B to wear radially outward while maintaining the axial end 50Z of the roller 50 partially covered. This is because as the wear occurs and the roller 50 migrates further away from the trailing edge 152T, the greater distance D21 that the trailing edge 152T extends away from the center point 60P compared to the distance D22, the lobe 152L maintains greater coverage of the axial end 50Z, compared to the lobes 52L shown in FIG. 3A.

While the asymmetric lobes 152L are shown and described for the first support plate 152, similar asymmetric lobes may be employed for the second support plate 154.

Figure 2F:
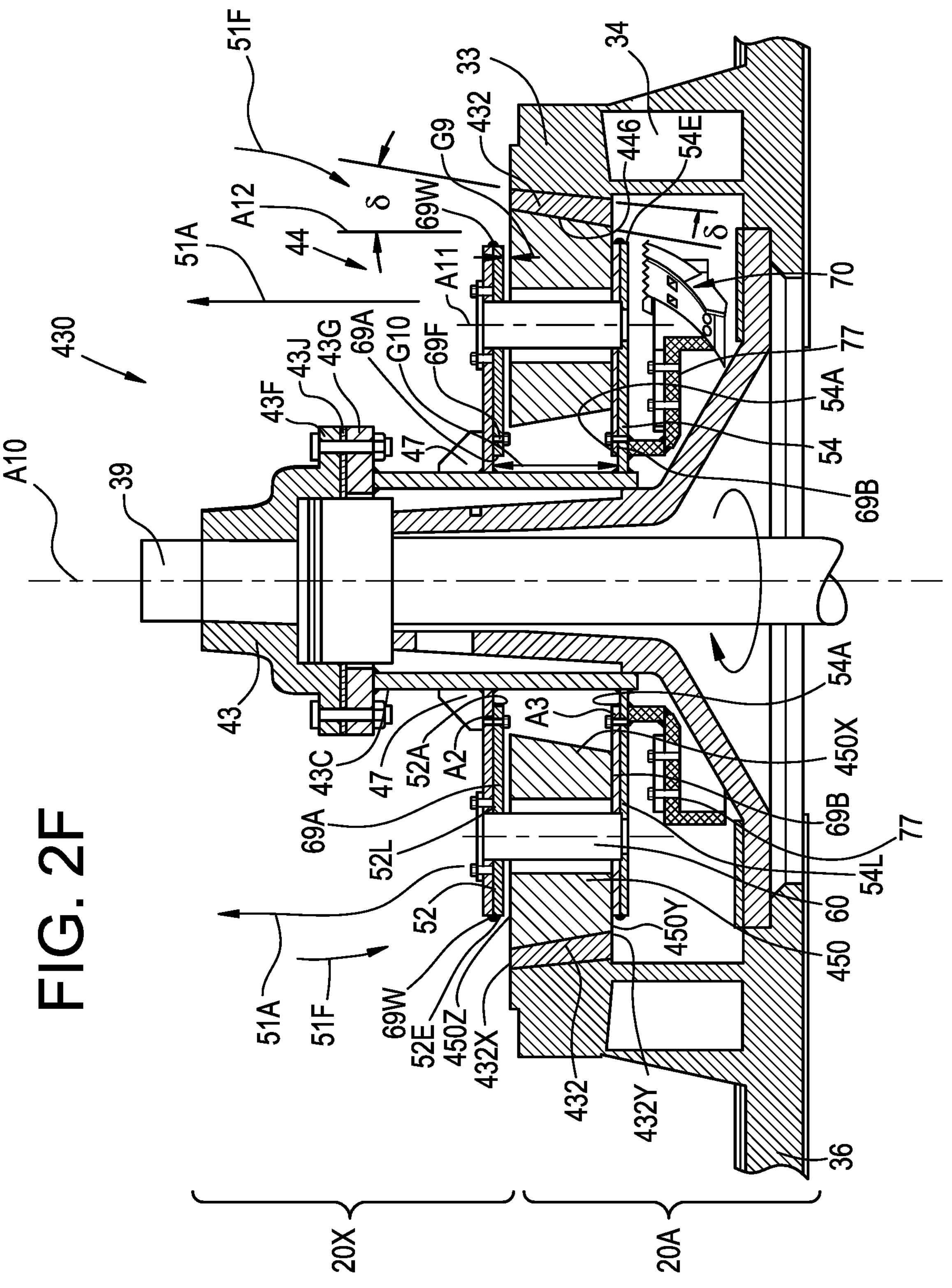
FIG. 2F is cross sectional view of another embodiment of the planetary roller mill of the present invention with conical rollers, wear plates and an alternative plow mounting configuration.
Figure 3D:
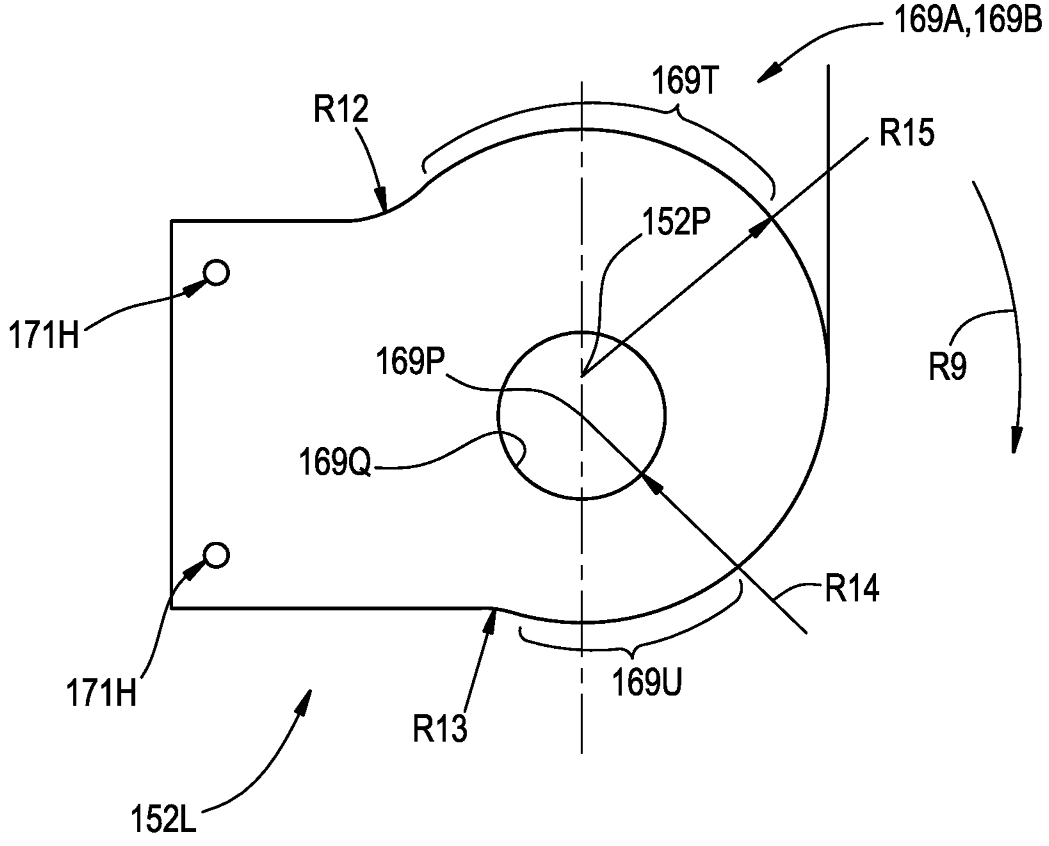
FIG. 3D is an enlarged view of a wear plate for use on the support plates of FIG. 3C.
Figure 3E:
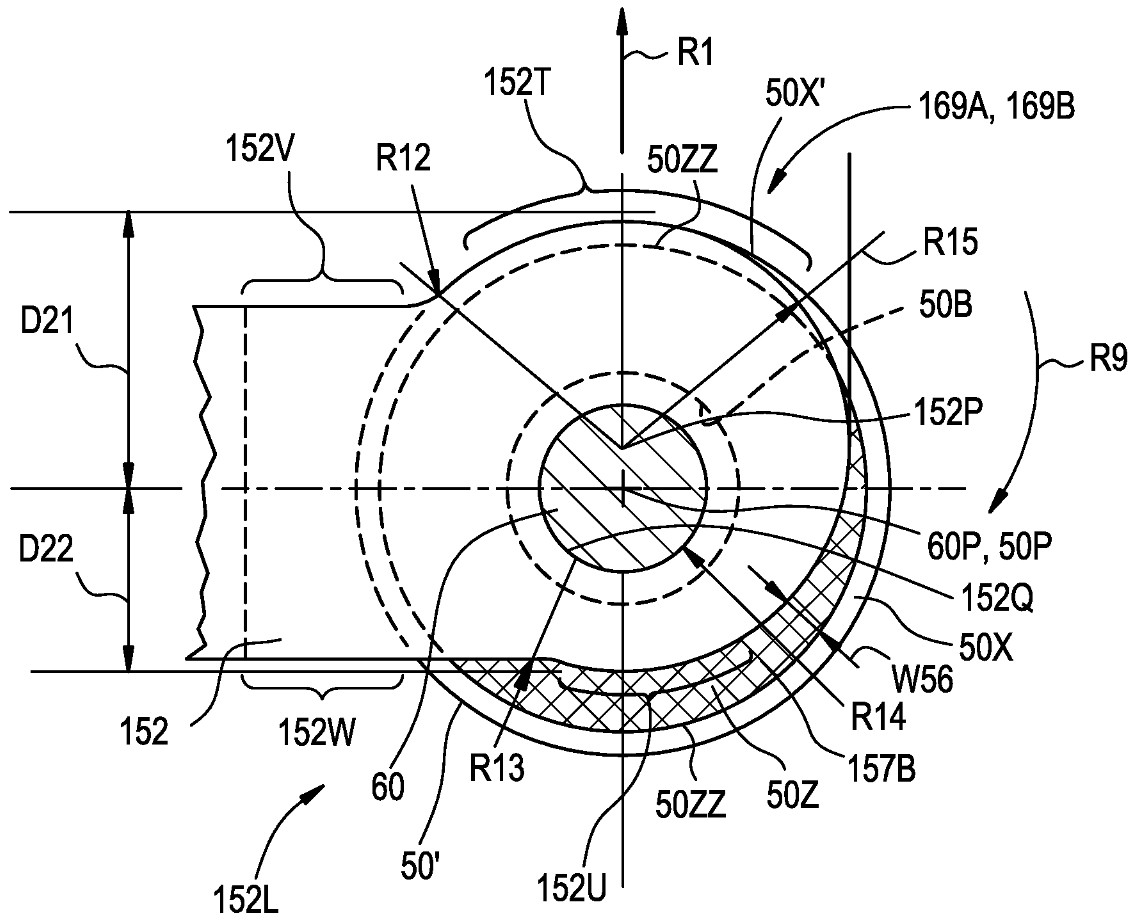
FIG. 3E is an enlarged view of one of the rollers and lobes of the support plate of FIG. 3D, shown in a neutral state.
Figure 3F:
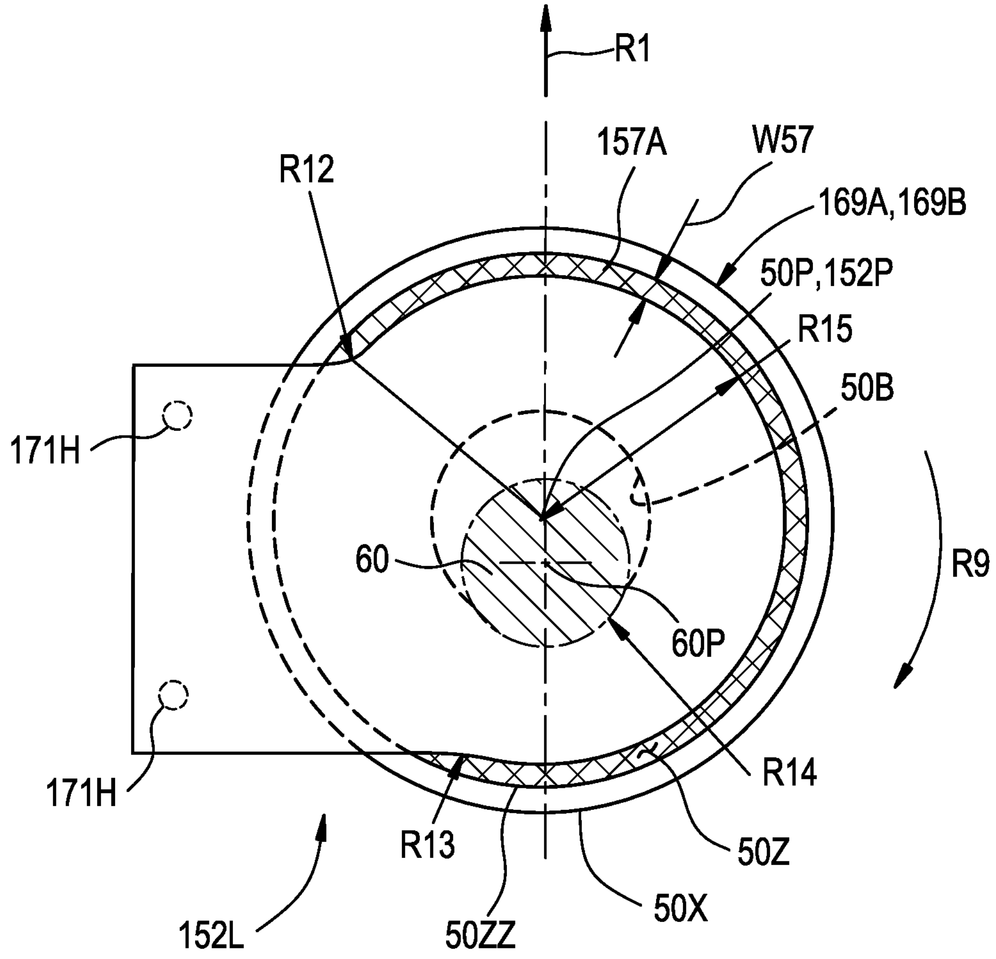
FIG. 3F is an enlarged view of one of the rollers and lobes of the support plate of FIG. 3D, shown in a rotating state.

As shown in FIG. 3D, wear plates 169A, 169B is similar to the wear plates 69A, 69B illustrated in FIGS. 2E and 2F, except that the wear plates 169A and 169B have an asymmetric shape complementary to the asymmetric shape of the lobes 152L described herein with reference to FIGS. 3C, 3E and 3F. The wear plates 169A, 169B are installed in the grinding section 20A similar to that shown and described herein with reference to FIGS. 2E and 2F for the wear plates 69A and 69B. Similar to the wear plates 69A and 69B, the wear plates 169A, 169B have holes 171H extending there through for receiving fasteners 69F that are threaded into the respective first and/or second support plates 52, 152, 54, 154 for securing the wear plates 169A, 169B thereto. The Applicant has overcome difficulty in mounting (e.g., wear plates are too hard to form threads therein and may require periodic replacement) the wear members 69A and 69B to the respective one of the first support plate 52 and the second support plate 54, by employing the fasteners 69F proximate a radially inward edge thereof while employing spot welds on a radially outer edge thereof.

As shown in FIG. 1A, the air supply manifold 45 has an outlet in the form of the circumferential duct 45B that is in communication with the opening 44 in the grinding ring 32 for supplying heated air through the opening 44 at a velocity and flow rate sufficient for drying and calcining the moist material to be ground. As shown in FIGS. 1A, 1B, 2A, and 2B, the heated air flows upward through the grinding section 20A and the feed section 20B as indicated by the arrows 51A. The feed material flows in a generally downward direction from the feed outlet 22B in the general direction of the arrows 51F and generally opposite to the direction indicated by the arrows 51A.

As shown in FIGS. 2E and 2F a first wear member 69A (e.g., a plate) is removably secured to an first axially facing surface 52A of each of the lobes 52L of the first support plate 52 by suitable fasteners 69F. The first wear member 69A is manufactured from a heat treated alloy steel that has a hardness of about 500-600 BHN. An axial end 50Z of the roller 50 slidingly engages the first wear member 69A. Each of the first wear members 69A has a shape that is complementary to the shape of a portion of the lobe 52L.

As shown in FIGS. 2E and 2F, a second wear member 69B (e.g., a plate) is removably secured to second axially facing surface 54A (i.e., upper side) of each of the lobes 54L of the second support plate 54 by suitable fasteners 69F. The second wear member 69B is manufactured from a heat treated alloy steel that has a hardness of about 500-600 BHN. An axial end 50Y of the roller 50 slidingly engages and is seated on the second wear member 69B. Each of the second wear members 69B has a shape that is complementary to the shape of a portion of the lobe 52L. In one embodiment, the wear members 69A and/or 69B are about ½ inch thick. In one embodiment, there is a small gap G9 (e.g., about 0.10 to 0.15 inches) between the underside of the first wear member 69A and the axial end 50Z of the roller 50.

As shown in FIG. 2F, the grinding assembly 430 has conical rollers 450 that have the radially outer surface 450X sloped at an angle δ relative to reference line A12 that is parallel to an axial center line A11 of the roller 450. The grinding ring 432 has conical grinding surface 446 that is sloped radially inward and axially downward from the axial upper edge 432X of a grinding ring 432 to the axial lower edge 432Y of the grinding ring 432 at the angle δ measured relative to a vertical reference line A12. The roller 450 is installed in the grinding ring 432 with the axial end 450Y (i.e., smaller diameter end compared to the axial end 450Z) facing down and below the axial end 450Z. The angle δ is between 5 and 15 degrees. The use of the conical rollers 450 and the conical grinding surface 446 has utility in providing a vertical lifting force which lifts the roller 450 to reduce the vertical force (e.g., about equal to 50-100% of the weight of the roller 450) applied to the wear member 69B. Reduction of the vertical force applied to the wear plate 69B reduces friction, wear and power consumption. Use of the conical rollers 450 and the conical grinding surface 446 also has utility in compensating for misalignment of the rollers 450 relative to the grinding ring 432 during assembly, because after a period of operation the rollers 450 migrate to a position favorable to grinding performance. The conical rollers 450 and conical grinding surface 446 can also be employed in configurations without the wear plates 69A and 69B, for example, in the grinding assemblies 30 of FIGS. 2A, 2B and 2C. The conical rollers 450 have an overlay 450K applied thereto, such as a cobalt based weld overlay (e.g., Stoody® 100 registered to Stoody Company or Stellite® registered to Kennametal Inc.). While the overlay 450K is shown and described as being applied to the conical rollers 450, the present invention is not limited in this regard as the overlay 450K can be applied to any of the rollers 50 shown in FIGS. 1A, 1B, 2A, 2B, 2C and 2E. The overlay 450K increases surface roughness and increases life of the rollers 450, 50 and helps prevent skidding or sliding of the rollers 450, 50 on the grinding surface 446, 46.

Employing the shim stack 43J, as described herein and shown in FIG. 2F, has utility in positioning the conical rollers 450 relative to the grinding ring 432 to maximize grinding surface area therebetween. Employing the shim stack 43J also has utility in vertically positioning the contoured rollers 50 of FIG. 2E in the grinding ring 32 to maximize the grinding surface area therebetween.

The first support plate and the second support plate are of a non-circular shape such that the optimum second area A2 of the first support plate 52 and the optimum third area A3 of the second support plate 54 are of magnitudes which configure a flow area FA (see FIGS. 3 and 4, for example showing the flow area FA as being the area A1 minus the area A2) through the opening of at least 30 percent of the first area A1 to provide a predetermined quantity of heated air in a ratio of 2-4 mass flow rate of air to mass flow rate of material being dried, to dry and/or calcining the feed material in the grinding assembly 30 and transport the ground material upwards through the grinding assembly 30 at a velocity (e.g., a velocity of about 20 feet per second to 40 feet per second) sufficient to entrain the ground material, in an air stream flowing upwardly through the grinding assembly 30. In one embodiment, the flow area FA is from 40 to 70 percent of the first area A1 so that the predetermined quantity of heated air is sufficient to dry and calcining synthetic gypsum, natural gypsum or mixtures of synthetic gypsum and natural gypsum. In one embodiment, the flow area FA is from 40 to 50 percent of the first area A1 so that the predetermined quantity of heated air is sufficient to dry and calcining synthetic and natural gypsum. The flow area FA extends from a radially outer edge 52E (see FIGS. 1A, 1B, 2A, 2B, 2C, 3A, 3B) of the first support plate 52 to the grinding surface 46. The flow area FA extends from a radially outer edge 54E (see FIGS. 1A, 1B, 2A, 2B, 2C, 3A, 3B) of the second support plate 54 to the grinding surface 46. The flow area FA extends from a radially outer edge 56E (see FIG. 2C) of the third support plate 56 to the grinding surface 46. The flow area FA includes an outlet of the grinding section 20A that transitions into the feed section 20B.

Configuring the flow area FA from 40 to 70 percent or from 40 to 50 percent of the first area A1 yields the surprising result of providing the predetermined quantity of heated air sufficient to dry and calcining synthetic gypsum having about 10 wt % (i.e., weight percent) surface moisture and about 20 wt % chemical bond moisture (i.e., collectively referred to as high moisture). Configuring the flow area FA from 40 to 70 percent or from 40 to 50 percent of the first area A1 yields the surprising result of providing the predetermined quantity of heated air sufficient to dry and calcining natural gypsum having about 5 wt % (i.e., weight percent) surface moisture and about 20 wt % chemical bond moisture (i.e., collectively referred to as high moisture). Configuring the flow area FA from 40 to 70 percent or from 40 to 50 percent of the first area A1 yields the surprising result of providing the predetermined quantity of heated air sufficient to dry and calcining a mixture of synthetic gypsum and natural gypsum having about 5 wt % to about 10 wt % (i.e., weight percent) surface moisture and about 20 wt % chemical bond moisture (i.e., collectively referred to as high moisture). In addition, configuring the flow area FA from 40 to 70 percent or from 40 to 50 percent of the first area A1 yields the surprising result of providing the predetermined quantity of heated air is sufficient to dry and calcining the feed material having about 10 wt % surface moisture and about 20 wt % chemical bond moisture. In one embodiment, the predetermined quantity of heated air is sufficient to dry and calcining the feed material having a particle size of less than 1 millimeter. In one embodiment, the predetermined quantity of heated air is sufficient to dry and calcining the feed material having a particle size of about 40 to about 80 microns.

In one embodiment, the flow area FA is from 30 to 60 percent of the first area A1 so that the predetermined quantity of heated air is sufficient to dry the feed material that includes one or more of Kaolin clay, bentonite, limestone, pet coke and coal. Configuring the flow area FA from 30 to 60 percent of the first area A1 yields the surprising result of providing the predetermined quantity of heated air sufficient to dry the feed material having a moisture content of greater than 5 wt %. Configuring the flow area FA from 30 to 60 percent of the first area A1 yields the surprising result of providing the predetermined quantity of heated air sufficient to dry the feed material having a moisture content of greater than 5 wt % and having a particle size of about 0.05 mm to about 50 mm.

In one embodiment, the flow area FA is from 30 to 40 percent of the first area A1 so that the predetermined quantity of heated air is sufficient to dry the feed material that includes one or more of Kaolin clay, bentonite, limestone, pet coke and coal. Configuring the flow area FA from 30 to 40 percent of the first area A1 yields the surprising result of providing the predetermined quantity of heated air sufficient to dry the feed material having a moisture content of greater than 5 wt %. Configuring the flow area FA from 30 to 40 percent of the first area A1 yields the surprising result of providing the predetermined quantity of heated air sufficient to dry the feed material having a moisture content of greater than 5 wt % and having a particle size of about 0.05 mm to about 50 mm.

For grinding, drying and calcining synthetic or natural gypsum or mixtures thereof, the Applicant discovered that the 40-70% flow area are required to provide sufficient air flow with enough heating capacity, while providing sufficient dwell time in the grinding section to produce a ground calcined product of a predetermined particle size. The Applicant has discovered that for grinding and drying of other material such as Kaolin clay, bentonite, limestone, pet coke and coal, that the 30-60% flow area is required to provide sufficient air flow with enough heating capacity, while providing sufficient grinding section to produce a ground dried product of a predetermined particle size.

As shown in FIGS. 1A and 2A, the radially outer surface 50X of each of the rollers is contoured (e.g., convex) and the grinding surface 46 of the grinding ring is contoured (e.g., concave). The present invention is not limited in this regard as in one embodiment, the radially outer surface 50X' of each of the rollers 50' is substantially straight and the grinding surface 46' of the grinding ring 32' is substantially straight, as shown in FIGS. 1B and 2B. FIGS. 1B and 2B are similar to FIGS. 1A and 2A with the exception of the aforementioned straight configuration and therefor include the same element numbers for identical components. Through computational analysis, the Applicant has found that the roller mills 10 (FIG. 1A) with the rollers 50 having the convex radially outer surface 50X and the concave grinding surface 46 consume less energy compared to the roller mills 10' (FIG. 1B) having straight radially outer surface 50X' and straight grinding surface 46'.

As best shown in FIG. 5, the grinding assembly 30 includes a plow assembly 70 rotatable with the shaft 39 and configured to transport the feed material from below the grinding assembly 30 upwards to the plurality of rollers 50' and grinding ring 32'. As shown in FIGS. 2E and 2F, the second support plate 54 is utilized as a mounting site for a plow support structure 77 to receive the plow assembly 70. Adjusting the number of shims in the shim stack 43J also adjusts the vertical position of the plow assembly 70, similar to that described herein for adjusting the vertical position of the rollers 50.

Figure 8:
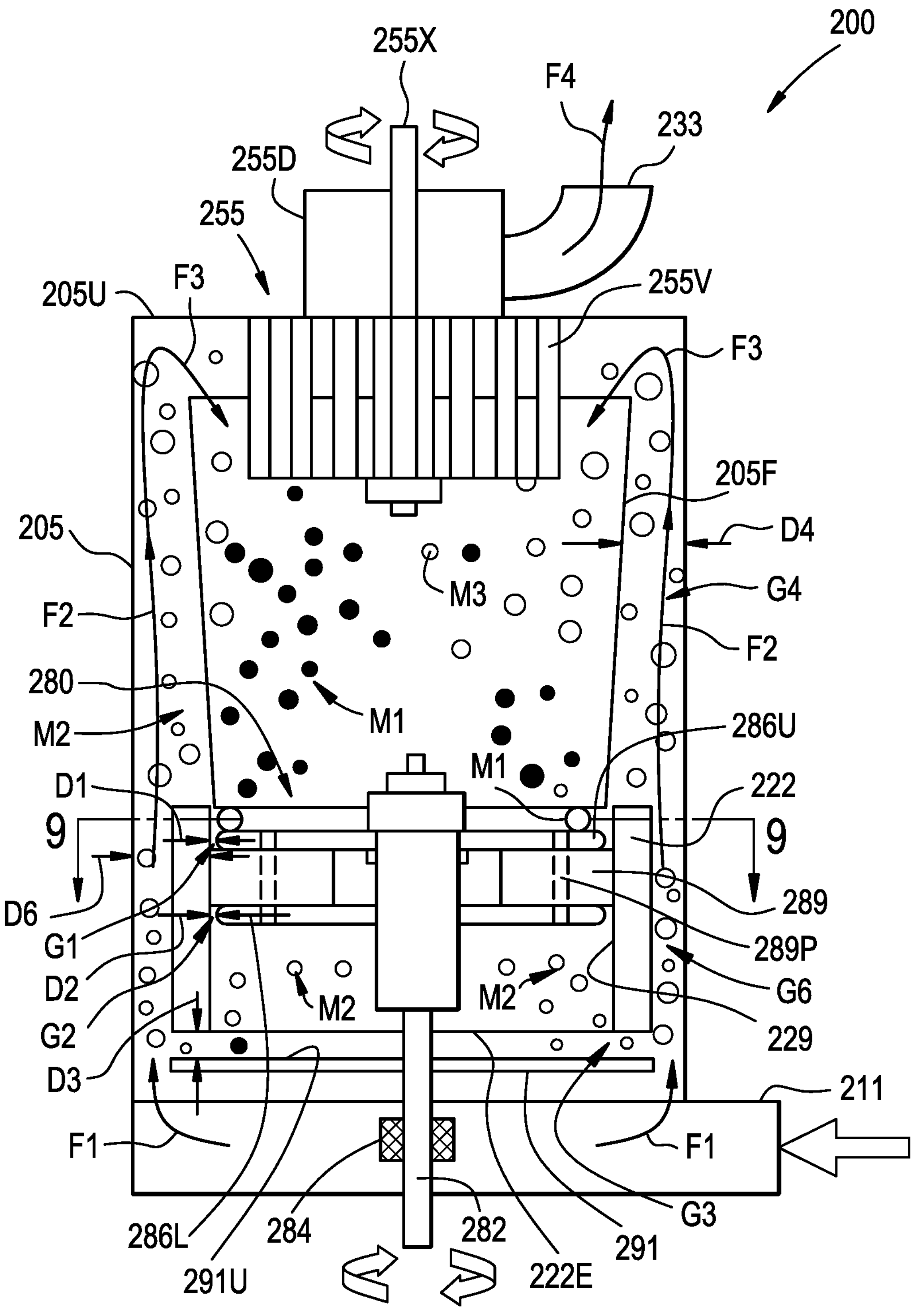
FIG. 8 PRIOR ART
FIG. 8 is a schematic view of a prior art planetary roller mill for ultra-fine grinding with air flow outside the grinding mill assembly.
Figure 9:
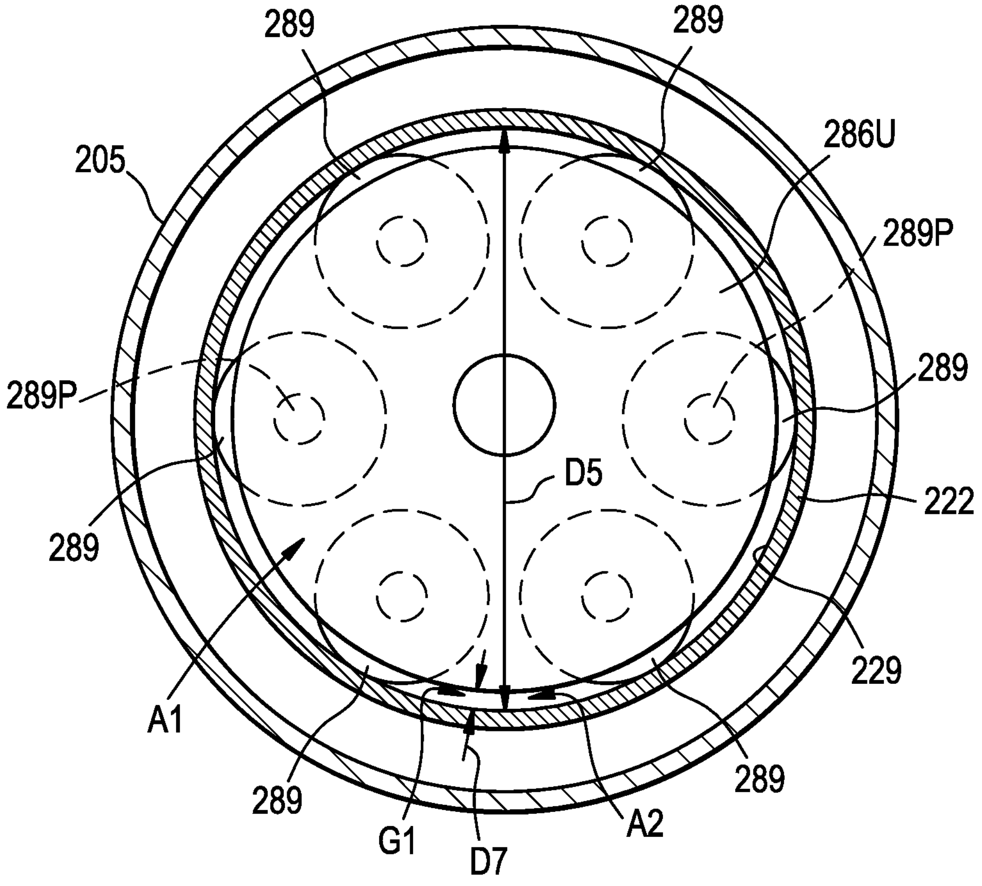
FIG. 9 PRIOR ART
FIG. 9 is a cross sectional view of the planetary roller mill of FIG. 8 taken across line 9-9.
Figure 10:
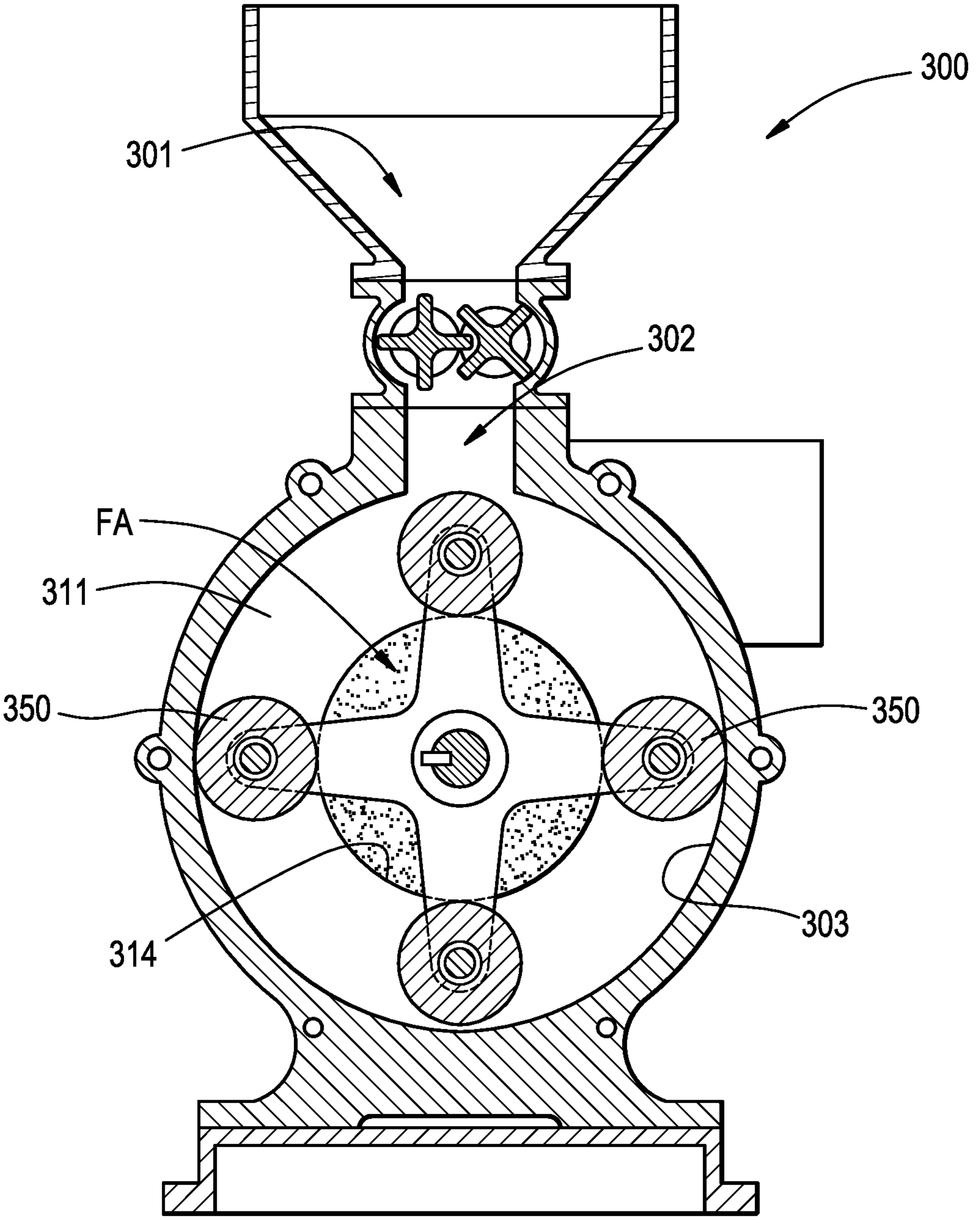
FIG. 10 PRIOR ART
FIG. 10 is a cross sectional view of a prior art pulverizer mill.

As shown in FIG. 2C, in one embodiment, the roller mill 30" has a multiple roller layered configuration (e.g., 2 layers of contoured rollers are shown) includes a third support plate 56 secured to the shaft 39 via the sleeve 43C (and the hub 43 shown in FIG. 2A). A plurality of contoured rollers 50 is shown positioned between the first support plate and the second support plate 54. The contoured rollers 50 have an arcuate curved circumferential surface 50X. The third support plate 56 is spaced axially apart from the first support plate 52 and the second support plate 54. An additional plurality of contoured rollers 50", similar to the contoured rollers 50, is mounted to and positioned between the third support plate and the second support plate 54. Each of the additional plurality of rollers 50" is configured to move between the first support plate, the second support plate and/or the additional support plate as a result of rotation of the shaft 39. Each of the plurality of contoured rollers 50 has the radially outer surface 50X that is in grinding communication with the contoured grinding surface 46 of the grinding ring 32, for example, the outer surface 50X rollingly engages the contoured grinding surface 46 of the grinding ring 32" or the outer surface 50X is in sufficient proximity to the contoured grinding surface 46 of the grinding ring 32 to effectuate grinding. Each of the plurality of additional rollers 50" has the radially outer surface 50X" that is in grinding communication with the contoured grinding surface 46" of the grinding ring 32", for example, the outer surface 50X" rollingly engages the contoured grinding surface 46" of the grinding ring 32" or the outer surface 50X" is in sufficient proximity to the contoured grinding surface 46" of the grinding ring 32" to effectuate grinding. The Applicant has found that the use of the multiple roller layer configuration shown in FIG. 2C, preferably a limit of two layers, is adequate because the two layers do not impede the upward flow of material to be ground as provided by the plow assembly 70, compared to prior art mills 200 (FIG. 8) that employ a top to bottom path for material being fed through the grinding assembly 280.

While FIG. 2C illustrates a first support plate 52 and a second support plate 54 with a plurality of rollers 50 there between and the plurality of additional rollers 50" positioned between the second support plate 54 and the third support plate 56, the present invention is not limited in this regard as any number of rows or layers of plurality of rollers between any number of support plates may be employed without departing from the broader aspects of the present invention.

The grinding assembly 30 has no lubrication system that provides a lubricant such as oil to the pin 60 and the bore 50B of the rollers 50, 50' or 50". As a result, the grinding assembly 30 is configured for grinding the feed material that requires an airstream supplied at a temperature that the pin 60 and the bore 50B of the rollers 50, 50' or 50" operate at greater than 177 degrees Celsius (350 degrees Fahrenheit) or higher (e.g., 232 degrees Celsius (450 degrees Fahrenheit)). Moreover, since the weight of the rollers 50, 50' or 50" is significantly less (e.g., 40 percent of) than a comparably sized journal assembly 188 of the prior art pendulum mill 100 shown and described with reference to FIGS. 6 and 7, with less grinding pressure and thus less vibration, but still able to achieve throughput required. As a result, the planetary roller mill 10 with the grinding assembly 30 is configured to grind, dry and calcining materials such as synthetic gypsum, natural gypsum or mixtures of synthetic gypsum and natural gypsum having a feed material particle size of 40 to 80 microns and a ground particle size of 25 to 35 microns.

The present invention includes a method of retrofitting a roller mill such as the pendulum mill 100 shown in FIG. 6. The method includes providing a roller mill, such as the pendulum mill 100, that has a vessel assembly 105 mounted to a stationary frame or base assembly 110 and a grinding assembly 180 positioned in the vessel assembly 105. The grinding assembly 180 includes a first grinding ring 133 that has a first opening extending therethrough. The first opening is defined by a first radially inward facing grinding surface 129 and has a first area. The first grinding ring 133 is in sealing engagement with the inside surface of the vessel assembly 105. A shaft 182 is rotatably mounted to the frame 110, for example by suitable bearings. A hub 186 is mounted to one end of the shaft 182, for example via a key and keyway configuration. A plurality of arms 187 (e.g., spider plates) extend from the hub 186. The grinding assembly 180 includes a plurality of journal assemblies 188 as shown in detail in FIG. 7. One of the plurality of journal assemblies 188 is pivotally secured to each of the plurality of arms 187. The grinding assembly 180 includes a plurality of first rollers 189. One of the plurality of first rollers 189 is rotatingly coupled to each journal assembly 188. The method of retrofitting the roller mill includes removing the plurality of arms 187, the plurality of journal assemblies 188 and the plurality of first rollers 189 from the roller mill. The shaft 189 and the hub 186 may be employed in the retrofitted roller mill, modified or replaced with the hub 43 and shaft 39 illustrated in FIGS. 1A, 2A, 2E and 2F, for example. The method includes providing a sleeve 43C, a first support plate 52, a second support plate 54 and a plurality of second rollers 50 such as, for example, those shown in FIGS. 1A, 2A, 2E and 2F. The sleeve 43C is positioned over the shaft 39 and the sleeve 43C is secured to the shaft 39 via the hub 43. The method includes securing the first support plate 52 to the sleeve 43C, for example by welding and use of the gussets 47. The first support plate 52 has a first axially facing surface 52A that defines a second area A2. The method includes securing the second support plate 54 to the sleeve 43C, for example by welding. The second support plate 54 has a second axially facing surface 54A that defines a third area A3. The second support plate 54 is spaced axially apart from the first support plate 52. The method includes rotatably mounting the plurality of second rollers 50 to and between the first support plate 52 and the second support plate 54 so that each of the plurality of rollers 50 is configured to move between the first support plate 52 and the second support plate 54 as a result of rotation of the shaft, as shown and described herein with reference to FIG. 2D. Each of the plurality of rollers 50 has a radially outer surface 50X. The first support plate 52 and the second support plate 54 are of a non-circular shape such that the second area A2 of the first support plate 52 and the third area A3 of the second support plate 54 are of magnitudes which configure a flow area FA through the first opening 44 of at least 30 percent of the first area A1 to provide a predetermined quantity of heated air to remove moisture from the feed material in the grinding assembly 20A.

In one embodiment, the method includes providing a first plow assembly 190 secured to the hub 186 by the plow support 191, as shown in FIG. 6. The first plow assembly 190 is removed from the pendulum mill 100. The method includes providing one or more second plow assemblies 70 and securing the second plow assembly 70 or assemblies to a bottom portion of the second support plate 54.

In one embodiment, the method includes removing the first grinding ring 133 (FIG. 6) from the mill 100. A second grinding ring 32 is provided, such as that shown in FIGS. 1A, 2A, 2E and 2F. The second grinding ring 32 has the first opening defined by the first radially inward facing grinding surface 46 and has the first area A1. The first area A1 of the first and second grinding rings 133, 32 may be equal or different in magnitude. The method includes installing the second grinding ring 32 in sealing engagement with the inside surface of the vessel assembly.

In one embodiment, the method includes installing the second grinding ring 32 in sealing engagement with the inside surface 20D of the vessel assembly 20.

In one embodiment, the method includes adjusting the vertical position of the rollers 50 relative to the grinding ring 32, for example, with the use of the shim stack 43J.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A grinding mill for processing feed material, the grinding mill comprising:

- a vessel assembly mounted to a stationary frame, the vessel assembly comprising a vessel having a vessel wall with an inside surface which defines an interior area of the vessel;
- a material feed supply in communication with the interior area via a feed outlet extending through the vessel wall, the feed outlet having a bottom edge and an upper edge;
- a grinding assembly positioned in the vessel, the grinding assembly comprising:
  - a grinding ring being in fixed relation to the vessel assembly and having an axially upward facing surface and an inwardly facing grinding surface; and
  - a plurality of grinding rollers rotatably mounted relative to the grinding surface, the plurality of grinding rollers being configured to grind the feed material against the grinding surface;

a ramp having an upper ramp end and a lower ramp end, the upper ramp end being removably secured to the inside surface proximate the feed outlet, the ramp extending downwardly and radially inward from the feed outlet, and the lower ramp end being located radially outward from the grinding surface and radially inward from the inside surface; and the ramp having a sloped portion between the upper ramp end and the lower ramp end, a space located between the sloped portion and the inner surface, such that the sloped portion is spaced radially apart from the inner surface, and the space and the lower ramp end are located radially outward from the rollers.

2. The grinding mill of claim 1, wherein the upper ramp end is secured to the inside surface at the bottom edge of the feed outlet.

3. The grinding mill of claim 1, wherein the upper ramp end is secured to the inside surface below the bottom edge of the feed outlet.

4. The grinding mill of claim 1, wherein the lower ramp end is located proximate the axially upward facing surface of the grinding ring or above the axially upward facing surface of the grinding ring.

5. The grinding mill of claim 1, wherein the lower ramp end rests on the axially upward facing surface of the grinding ring.

6. The grinding mill of claim 1, wherein the lower ramp end is spaced apart from the grinding surface by a radial distance configured to accommodate wear of the grinding ring thereby maintaining space between the lower ramp end and radially outer surfaces of the grinding rollers.

7. The grinding mill of claim 1, wherein the ramp forms an air-flow disruption minimizer feature configured for use in grinding and drying of synthetic gypsum, natural gypsum, clay and limestone, which contains more than 25 percent fine particle sizes of 1 mm or less.

8. The grinding mill of claim 1, further comprising a cover positioned over the feed outlet and at least a portion of the ramp.

9. The grinding mill of claim 8, wherein the cover comprises at least one of a front sloped wall and at least one side wall.

10. The grinding mill of claim 8, wherein a portion of the cover is disposed radially outwardly from the grinding rollers.

11. The grinding mill of claim 8, wherein a portion of the cover is disposed over a portion of the grinding rollers.

12. The grinding mill of claim 8, wherein the cover has a top cover end that is secured to the inside surface above the upper edge of the feed outlet.

13. The grinding mill of claim 9, wherein the front sloped wall terminates at a bottom cover end of the cover which is located at a distance above the axially upward facing surface of the grinding ring.

14. The grinding mill of claim 9, wherein the front sloped wall terminates at a bottom cover end of the cover which is coplanar with the axially upward facing surface of the grinding ring.

15. The grinding mill of claim 8, further comprising a direct and unobstructed flow path between the feed outlet and a grinding section for material to be ground, the flow path being formed by the ramp and the cover.

16. The grinding mill of claim 8, wherein the cover comprises a sloped surface supported by opposing side walls.

17. The grinding mill of claim 8, wherein the ramp and the cover cooperate to form a material carry-away deterrent feature configured to inhibit fine particles of sizes 1 mm or less, of the feed material from being carried away by an updraft in the grinding mill and to urge the feed material into the grinding section.

18. The grinding mill of claim 8, wherein the ramp and the cover cooperate to form an air-flow disruption minimizer feature configured for use in grinding and drying of synthetic gypsum, natural gypsum, clay and limestone, which contains more than 25 percent fine particle sizes of 1 mm or less.

19. The grinding mill of claim 16, wherein the ramp, the cover and the opposing side walls are integrally formed.

20. The grinding mill of claim 16, wherein the ramp, the cover and the opposing side walls are removably secured to the inside surface.

21. The grinding mill of claim 1, wherein the grinding assembly comprises one of:

a planetary grinding roller and support plate assembly; and a pendulum grinding roller and support structure assembly.

22. The grinding mill of claim 8, wherein the grinding assembly comprises one of:

a planetary grinding roller and support plate assembly; and a pendulum grinding roller and support structure assembly.

23. A grinding mill for processing feed material, the grinding mill comprising:

a vessel assembly mounted to a stationary frame, the vessel assembly comprising a vessel having a vessel wall with an inside surface which defines an interior area of the vessel;

a material feed supply in communication with the interior area via a feed outlet extending through the vessel wall, the feed outlet having a bottom edge and an upper edge;

a grinding assembly positioned in the vessel, the grinding assembly comprising:

a grinding ring being in fixed relation to the vessel assembly and having an axially upward facing surface and an inwardly facing grinding surface; and a plurality of grinding rollers rotatably mounted relative to the grinding surface, the plurality of grinding rollers being configured to grind the feed material against the grinding surface;

a cover having a front sloped wall, the cover being positioned over the feed outlet; and the cover has a top cover end that is secured to the inside surface above the upper edge of the feed outlet and there is a space between the cover and the inside surface above the upper edge of the feed outlet; and a ramp removably secured to the inside surface below the feed outlet.

24. The grinding mill of claim 23, wherein the cover comprises at least one side wall.

25. The grinding mill of claim 23, wherein a portion of the cover is disposed radially outwardly from the grinding rollers.

26. The grinding mill of claim 23, wherein a portion of the cover is disposed over a portion of the grinding rollers.

27. The grinding mill of claim 23, wherein the cover has a top cover end that is secured to the inside surface above the upper edge of the feed outlet.

28. The grinding mill of claim 24, wherein the front sloped wall terminates at a bottom cover end of the cover which is located at a distance above the axially upward facing surface of the grinding ring.

29. The grinding mill of claim 24, wherein the front sloped wall terminates at a bottom cover end of the cover which is coplanar with the axially upward facing surface of the grinding ring.

30. The grinding mill of claim 23, further comprising a direct and unobstructed flow path between the feed outlet and a grinding section for material to be ground, the flow path being formed by the cover.

31. The grinding mill of claim 23, wherein the cover comprises a sloped surface supported by opposing side walls.

32. The grinding mill of claim 23, wherein the cover forms a material carry-away deterrent feature configured to inhibit fine particles of sizes 1 mm or less, of the feed material from being carried away by an updraft in the grinding mill and to urge the feed material into the grinding section.

33. The grinding mill of claim 23, wherein the cover forms an air-flow disruption minimizer feature configured for use in grinding and drying of synthetic gypsum, natural gypsum, clay and limestone, which contains more than 25 percent fine particle sizes of 1 mm or less.

34. The grinding mill of claim 31, wherein the cover and the opposing side walls are integrally formed.

35. The grinding mill of claim 31, wherein the cover and the opposing side walls are removably secured to the inside surface.

36. The grinding mill of claim 23, wherein the grinding assembly comprises one of:

- a planetary grinding roller and support plate assembly; and
- a pendulum grinding roller and support structure assembly.

37. A grinding mill for processing feed material, the grinding mill comprising:

- a vessel assembly mounted to a stationary frame, the vessel assembly comprising a vessel having a vessel wall with an inside surface which defines an interior area of the vessel;
- a material feed supply in communication with the interior area via a feed outlet extending through the vessel wall, the feed outlet having a bottom edge and an upper edge;
- a grinding assembly positioned in the vessel, the grinding assembly comprising:
  - a grinding ring being in fixed relation to the vessel assembly and having an axially upward facing surface and an inwardly facing grinding surface; and
  - a plurality of grinding rollers rotatably mounted relative to the grinding surface, the plurality of grinding rollers being configured to grind the feed material against the grinding surface;
- a ramp having an upper ramp end and a lower ramp end, the upper ramp end being removably secured to the inside surface proximate the feed outlet, the ramp extending downwardly and radially inward from the feed outlet, and the lower ramp end being located radially outward from the grinding surface and radially inward from the inside surface;
- a cover having a front sloped wall, the cover being positioned over the feed outlet; and
- a lowermost end of the cover and radially inward located portion of the ramp define an opening that faces downwardly and projects vertically over both a radially innermost segment of the axial upper edge of the grinding ring and a radially outermost segment of the rollers.

38. The grinding mill of claim 37, wherein the grinding assembly comprises one of:

- a planetary grinding roller and support plate assembly; and
- a pendulum grinding roller and support structure assembly.

39. The grinding mill of claim 37, wherein the ramp has a sloped portion between the upper ramp end and the lower ramp end, a space located between the sloped portion and the inner surface, such that the sloped portion is spaced radially apart from the inner surface, and the space and the lower ramp end are located radially outward from the rollers.

40. The grinding mill of claim 37, wherein the cover has a top cover end that is secured to the inside surface above the upper edge of the feed outlet and there is a space between the cover and the inside surface above the upper edge of the feed outlet.

41. The grinding mill of claim 37, wherein the opening is horizontal.

42. A grinding mill for processing feed material, the grinding mill comprising:

- a vessel assembly mounted to a stationary frame, the vessel assembly comprising a vessel having a vessel wall with an inside surface which defines an interior area of the vessel;
- a material feed supply in communication with the interior area via a feed outlet extending through the vessel wall, the feed outlet having a bottom edge and an upper edge;
- a grinding assembly positioned in the vessel, the grinding assembly comprising:
  - a grinding ring being in fixed relation to the vessel assembly and having an axially upward facing surface and an inwardly facing grinding surface; and
  - a plurality of grinding rollers rotatably mounted relative to the grinding surface, the plurality of grinding rollers being configured to grind the feed material against the grinding surface;
- a ramp having an upper ramp end and a lower ramp end, the upper ramp end being removably secured to the inside surface proximate the feed outlet, the ramp extending downwardly and radially inward from the feed outlet, and the lower ramp end being located radially outward from the grinding surface and radially inward from the inside surface;
- a cover having a front sloped wall, the cover being positioned over the feed outlet and extending vertically below the bottom edge of the feed outlet.

* * * * *